United States Patent [19]

Maki

[11] Patent Number: 5,754,814
[45] Date of Patent: May 19, 1998

[54] CACHE MEMORY APPARATUS FOR READING DATA CORRESPONDING TO INPUT ADDRESS INFORMATION

[75] Inventor: Kazuhiko Maki, Tokyo, Japan

[73] Assignee: Oki Electric Industry Co., Ltd., Japan

[21] Appl. No.: 295,685

[22] PCT Filed: Mar. 1, 1993

[86] PCT No.: PCT/JP93/00252

§ 371 Date: Aug. 24, 1994

§ 102(e) Date: Aug. 24, 1994

[87] PCT Pub. No.: WO93/17386

PCT Pub. Date: Sep. 2, 1993

[30] Foreign Application Priority Data

Feb. 28, 1992 [JP] Japan ................... 4-041774

[51] Int. Cl.$^6$ ................................................. G06F 12/08
[52] U.S. Cl. ................. 395/403; 395/465; 395/472; 395/481; 395/414; 395/464; 395/421.03; 395/421.1
[58] Field of Search ................... 395/440, 445, 395/465, 467, 403, 464, 442, 481, 414, 421.03, 421.1

[56] References Cited

U.S. PATENT DOCUMENTS

| 4,970,643 | 11/1990 | Cramm | 395/403 |
|---|---|---|---|
| 5,123,108 | 6/1992 | Olson et al. | 395/800 |
| 5,485,589 | 1/1996 | Kocis et al. | 395/421.03 |

FOREIGN PATENT DOCUMENTS

| A-0 029 517 | 6/1981 | European Pat. Off. | G06F 13/00 |
|---|---|---|---|
| 0 552 667 A1 | 7/1993 | European Pat. Off. | G06F 12/08 |
| 61-5357 | 1/1986 | Japan . | |
| A-62-072 041 | 4/1987 | Japan | G06F 12/08 |

OTHER PUBLICATIONS

Harold S. Stone, "High Performance Computer Architecture", mar. 30, 1989, Mauzen, pp. 23-42 with translation.

Primary Examiner—Tod R. Swann
Assistant Examiner—D. Tran
Attorney, Agent, or Firm—Edward D. Manzo; Mark J. Murphy

[57] ABSTRACT

A accordance determining circuit (113) that determines whether or not a cache address CA required in updating a cache data memory (111) and a cache tag memory (112) accords with the address of data read from an external memory (130) is provided. When the accordance determining circuit (150) has determined an accordance state, a register (115) is enabled so that cache data read from the external memory (130) is stored in a register (115) and supplied to a cache requester (101). Alternatively, a means for generating an address corresponding to the next data of data to be updated in updating the cache data memory (111) and (112) is provided so as to determine the cache status of an address being generated. Thus, if the determined result represents that the cache data has not been stored, a plurality of data are updated at a time. Consequently, the mis-hit penalty time can be reduced and the hit ratio can be improved.

12 Claims, 17 Drawing Sheets

CACHE MEMORY APPARATUS FOR READING DATA CORRESPONDING TO INPUT ADDRESS INFORMATION

BACKGROUND OF THE INVENTION

The present invention relates to a cache memory apparatus for reading data at high speed for use with an information processing unit such as a microprocessor (hereinafter referred to as an MPU).

Cache memory apparatuses have been widely used to improve the processing speeds of information processing units. The technologies of the cache memory apparatuses are described in, for example:

(1) Harold S. Stone, "High Performance Computer Architecture (Translated Title)", Mar. 30, 1989, Maruzen, pp. 23–42.

(2) Nikkei Electronics [434], Nov. 16, 1987, Nikkei BP Company, pp. 159–174.

In the documents 1 and 2, the basic constructions of conventional cache memory apparatus are described. The conventional cache memory apparatus includes a memory having a smaller storage amount than an external memory so as to increase processing speeds. This memory is referred to as a cache memory. When data that is often read is stored in the cache memory, this data can be quickly read. When required data is not stored in the cache memory, it is read from an external memory of the cache memory apparatus. The required data is then read at a normal speed. Next, a practical construction of the cache memory apparatus and an operation thereof will be described.

FIG. 2 is a schematic diagram showing a basic circuit of a conventional cache memory apparatus.

In FIG. 2, reference numeral 50 is a cache memory apparatus. The cache memory apparatus 50 outputs cache data CD to a data read requester 1 (hereinafter, the data read requester is referred to as a cache requester) such as a central processing unit according to a cache address CA requested thereby.

The cache memory apparatus 50 comprises a control circuit 10, a cache tag memory 11, a cache data memory 12, and an accordance determining circuit 13. The control circuit 10 controls inner circuits of the cache memory apparatus 50. The cache tag memory 11 is constructed of a small-capacity, high-speed random access memory (hereinafter referred to as RAM) or the like. The cache data memory 12 is also constructed of a RAM or the like. The cache tag memory 11 stores part of addresses of data stored in the cache data memory 12. The cache tag memory 11 has an address terminal A, a data input/output terminal D (hereinafter referred to as an I/O terminal), a write enable terminal WE, and terminals VAi and VAo. The write enable terminal WE is activated by the control circuit 10. Likewise, the terminals VAi and VAo are activated by the control circuit 10. The cache data memory 12 stores data that is often read. The cache data memory 12 has an address terminal A, an I/O terminal D, and a write enable terminal WE. The write enable terminal WE is activated by the control circuit 10. The accordance determining circuit 13 has an enable terminal E. When the enable terminal E is activated, the accordance determining circuit 13 detects whether or not two information accord with each other. When the two information accord with each other, the accordance determining circuit 13 outputs a hit signal HIT.

The cache memory apparatus 50 also comprises registers 14 and 15, an external register 16, tri-state buffers 17, 18, 20, and 21, an AND gate 19, and an IA bus 22. The register 14 has an enable terminal E. When the enable terminal E is activated with a hit signal HIT, the register 14 stores a cache address CA. The register 15 also has enable terminal E. When the enable terminal E is activated with a hit signal HIT, the register 15 stores cache data CD that is received through an ID bus 23. The external register 16 has a count enable terminal CE. When the count enable terminal CE is activated by the control circuit 10, the external register 16 stores an address EA. The tri-state buffers 17, 18, 20, and 21 are controlled by the control circuit 10.

Address terminals A of the cache tag memory 11 and the cache data memory 12 are connected to the output side of the register 14, which stores a cache address CA, through the tri-state buffer 17 and the IA bus 22. The register 14 outputs the number of bits a of a cache address CA to the IA bus 22. $\text{Log}_2$ (the number of tags)=b of the number of bits a is supplied to the address terminal A of the cache tag memory 11. The low order portion (b+1) {where 1=$\text{Log}_2$ (the number of lines)} of the cache address CA is supplied to the address terminal A of the cache data memory 12. The high order portion (a−b−1) of the cache address CA is supplied to both the I/O terminal D of the cache tag memory 11 and the accordance determining circuit 13. The terminal VAo of the cache tag memory 11 is connected to the enable terminal E of the accordance determining circuit 13 through the AND gate 19, which is controlled by the control circuit 10.

The I/O terminal D of the cache data memory 12 is connected to the ID bus 23. The ID bus 23 is connected to the input side of the register 15. The external register 16 is connected to the output side of the register 14. The counter enable terminal CE of the control circuit 10 is activated by the control circuit 10. When the terminal CE is activated, the external register 16 stores the number of bits a (=address EA) of the cache address CA supplied from the register 14. The output side of the external register 16 is connected to both the IA bus 22 through the tri-state buffer 20 and an address terminal A of an external memory 30, which is constructed of a large-capacity, low-speed RAM or the like. The external memory 30 also has a data output terminal D, a terminal D-WAIT, and so forth as well as the address terminal A. The terminal D-WAIT outputs a signal that causes the cache memory apparatus 50 to becomes a wait state. The data output terminal D is connected to the ID bus 23 through the tri-state buffer 21. The terminal D-WAIT is connected to the input side of the control circuit 10.

FIG. 3 is a schematic diagram for explaining data stored in the cache tag memory 11. The cache tag memory 11 is constructed of addresses (tags), valid bits, and so forth. The addresses (tags) are grouped so as to reduce the hardware amount. The number of groups is referred to as the number of lines number (or the number of blocks). The adjacent addresses are normally grouped. In FIG. 3, one group has four data. For example, data with same bits except for the two low order bits are defined as one group.

Next, the operation of the cache memory apparatus 50 shown in FIG. 2 will be described.

When the cache requester 1 supplies a cache address CA to the cache memory apparatus 50, the cache address CA is temporarily stored in the register 14. Thereafter, the cache address CA is read, and it is determined whether or not data corresponding to the cache address CA is stored in the cache memory 12 (namely, whether or not a hit takes place). In other words, the accordance determining circuit 13 determines whether or not the cache address CA, which has been output from the register 14 to the IA bus 22 through the tri-state buffer 17 accords with the content of the cache tag memory 11. When they accord with each other (hereinafter this condition is referred to as hit), the accordance determining circuit 13 outputs a hit signal HIT to the control circuit 10 and the enable terminals E of the registers 14 and 15. When the hit signal HIT is input to the control circuit 10, an output signal of the control circuit 10 activates the write enable terminals WE of the cache tag memory 11 and the cache data memory 12. Thus, data designated with the low order portion (b+1) of the cache address CA is supplied from the cache data memory 12 to the ID bus 23. The data supplied to the ID bus 23 is cache data CD and output to the cache requester 1 through the register 15.

On the other hand, if the data corresponding to the cache address CA requested by the cache requester 1 does not accommodate (this condition is hereinafter referred to as mis-hit), the cache register 16, which is activated by the output signal of the control circuit 10, supplies the number of bits a (EA) of the cache address CA to the address terminal A of the memory 30. Thus, record data corresponding to the number of bits a is supplied from the output terminal D of the memory 30. The read data is supplied to the cache data memory 12 through the tri-state buffer 21. Thus, the content of the cache data memory 12 is updated. Thereafter, the read data is cache data CD and supplied to the cache requester 1 through the ID bus 23 and the register 15. In this case, the read data is cache data CD.

Thus, when a mis-hit takes place, data for one line including an address where the mis-hit took place is read from the external memory 30. Consequently, the content of the cache data memory 12 is updated. There are two methods for updating the content of the cache data memory 12 corresponding to the occurrence of a mis-hit and for supplying real cache data CD to the cache requester 1.

First method

FIG. 4 is a timing chart showing the operation of the cache memory apparatus 50 shown in FIG. 2. In the drawing, m, n+1, . . . represent addresses. Mis-hit penalty time is a time period for which cache data becomes valid after a mis-hit took place.

In FIG. 4, n+1="x . . . x01" (in binary notation). As shown in FIG. 3, one line has four addresses. The external memory can be accessed in two cycles. One tag includes one valid bit. In each of four write operations, tag data (="x . . . x") is written. However, in the last write operation, valid information is written to the valid bit. The low order two bits of the external register 16 shown in FIG. 2 work as a counter. Whenever a mis-hit takes place, the value of the cache address CA is loaded and the lower two bits are cleared to "00".

As the most simplest method for updating the cache data memory 12 after the occurrence of a mis-hit and supplying the real cache data CD to the cache requester 1, as shown in FIG. 4, when a mis-hit takes place, data is read from a predetermined address from a line that includes it. For example, as shown in FIG. 4, if one line has four addresses, data is read in the order of "xx . . . x00", "x . . . x01", "x . . . x10", and "x . . . x11". While the data is being read, the cache data memory 12 is used for updating the data. Thus, even if the cache data CD is read, it does not become valid.

Second method

By memory interleave method or access method employing the characteristics of dynamic RAM (hereinafter referred to as DRAM) with such as page mode or static column, burst transmission may be supported so as to shorten the mis-penalty time.

FIG. 5 is a schematic diagram showing a circuit of a cache memory apparatus 51 according to the second method. Those constructional portions common to FIG. 2 are denoted by the same reference numerals.

The cache memory apparatus 51 employs DRAM page mode. The difference between the cache memory apparatus shown in FIG. 5 and that shown FIG. 2 is in that a counter output of the external register 16 is incremented by an adder 35. The output of the adder 35 is supplied to a selector 36. The output of the selector 36 is supplied to the counter. In FIG. 5, reference numeral 40 represents a connected line.

A cache address CA requested by a cache requester 1 is constructed of a tag TAG, a line address LA, and an in-line address IA that are stored in the order of the most significant bit (MSB) to the least significant bit (LSB) of the register 14. One of the outputs of the in-line address IA and the adder 35 is selected by the selector 36. The output of the selector 36 is supplied to a counter of an external register 16. The external memory 30 is constructed of a DRAM. To operate the DRAM in the page mode, a low address strobe signal (hereinafter referred to as $RAS_N$ ($_N$ represents negative logic)), a column address strobe signal (hereinafter referred to as $CAS_N$), and a memory control signal S10 that represents a wait signal ratio are exchanged between the external memory 30 and the control circuit 10.

In the DRAM page mode, while $RAS_N$ is in L level, $CAS_N$ pulses are successively supplied so as to perform read/write operations at high speed. In this mode, while the $RAS_N$ is in "L" level and the bit line level is kept in "L" level or "H" level, the CAS operation is repeatedly performed so as to write or read data to a desired bit line.

FIG. 6 is a timing chart showing the operation of FIG. 5. In this timing chart, one line has four data. CK represents a clock. n represents that the low order two bits are "0".

In the cache memory apparatus 51 shown in FIG. 5, when a required cache address CA is stored in the register 14, the accordance determining circuit 13 determines whether or not a tag TAG stored in the register 14 accords with data read from the cache tag memory 11 through the data output terminal Do. When these data do not accord with each other, a mis-hit takes place. Thus, the tag TAG stored in the register 14 is supplied to the external register 16 through a line 40. The output of the external register 16 is supplied to the address terminal A of the external memory 30. With the memory control signal S10, data is read from the data terminal D of the external memory 30 at a high speed in the page mode and supplied as cache data CD to the input terminal Di of the cache data memory 12. The cache data CD is read from the output terminal Do of the cache data memory 12. Thus, a mis-hit penalty time can be shortened.

However, the above-described cache memory apparatuses 50 and 51 have the following drawbacks.

In the cache memory apparatus 50 as shown in FIG. 2, when a mis-hit occurs, since it takes a long time to write the mis-hit data to the cache data memory 12, and the mis-hit penalty time for which data is read is long.

In the cache memory apparatus 51 shown in FIG. 5, since the process time of the DRAM, which constructs the external memory 30 and so forth, is lower than the burst transmission rate, to read the mis-hit data several clock periods are required. First one mis-hit data is followed by four data as shown in FIG. 6.

In the cache memory apparatus 51, even if the next line of a line containing an address at which a mis-hit took place is required, the cache memory apparatus 51 exits the burst transmission access mode. Thus, the cache memory apparatus 51 should wait until the first data of the line is received after another mis-hit took place. In other words, when data of a line containing a mis-hit is updated, although it can be estimated that another mis-hit will take place in data of the subsequent addresses, data of only a predetermined line is updated. Thus, the hit rate is low. Consequently, cache memories with technical satisfaction were difficult to accomplish.

An object of the present invention is to provide a cache memory that solves the problem of a long mis-hit penalty time and a low hit rate without an increase of hardware amount.

SUMMARY OF THE INVENTION

To solve the above-described problems, the present invention is directed to a cache memory apparatus comprising a first cache memory for storing high order address information of address information corresponding to desired data, a second cache memory for storing a plurality of low order address information of the high order address information and a plurality of data corresponding to the plurality of low order address information, a first accordance determining circuit for comparing high order address information of address information being input with the high order address information stored in the first cache memory so as to determine whether or not they accord with each other, a register for storing a plurality of input address information and for generating a plurality of address information included in the high order address information of the input address information only when the first detecting circuit has determined a non-accordance state, a control circuit for reading data corresponding to the input address information from the second cache memory when the first accordance determining circuit has determined an accordance state, for writing the high order address information of the address information corresponding to the plurality of address information included in the high order address information of the address information generated by the register to the first cache memory when the first accordance determining circuit has determined a non-accordance state, and for writing the low order address information of the address information and the plurality of data corresponding to the address information stored in an external memory to the second cache memory, a second accordance determining circuit for determining whether or not the address information generated by the register accords with the input address information, and an output circuit for outputting data corresponding to the input address information supplied from the second cache memory when the first accordance determining circuit has determined an accordance state, for outputting data corresponding to the input address information supplied from the external memory when the second accordance determining circuit has determined an accordance state, and for outputting no data corresponding to the input address information when both the first and second accordance determining circuits have determined a non-accordance state.

DESCRIPTION OF THE PREFERRED EMBODIMENTS

Figure 1:
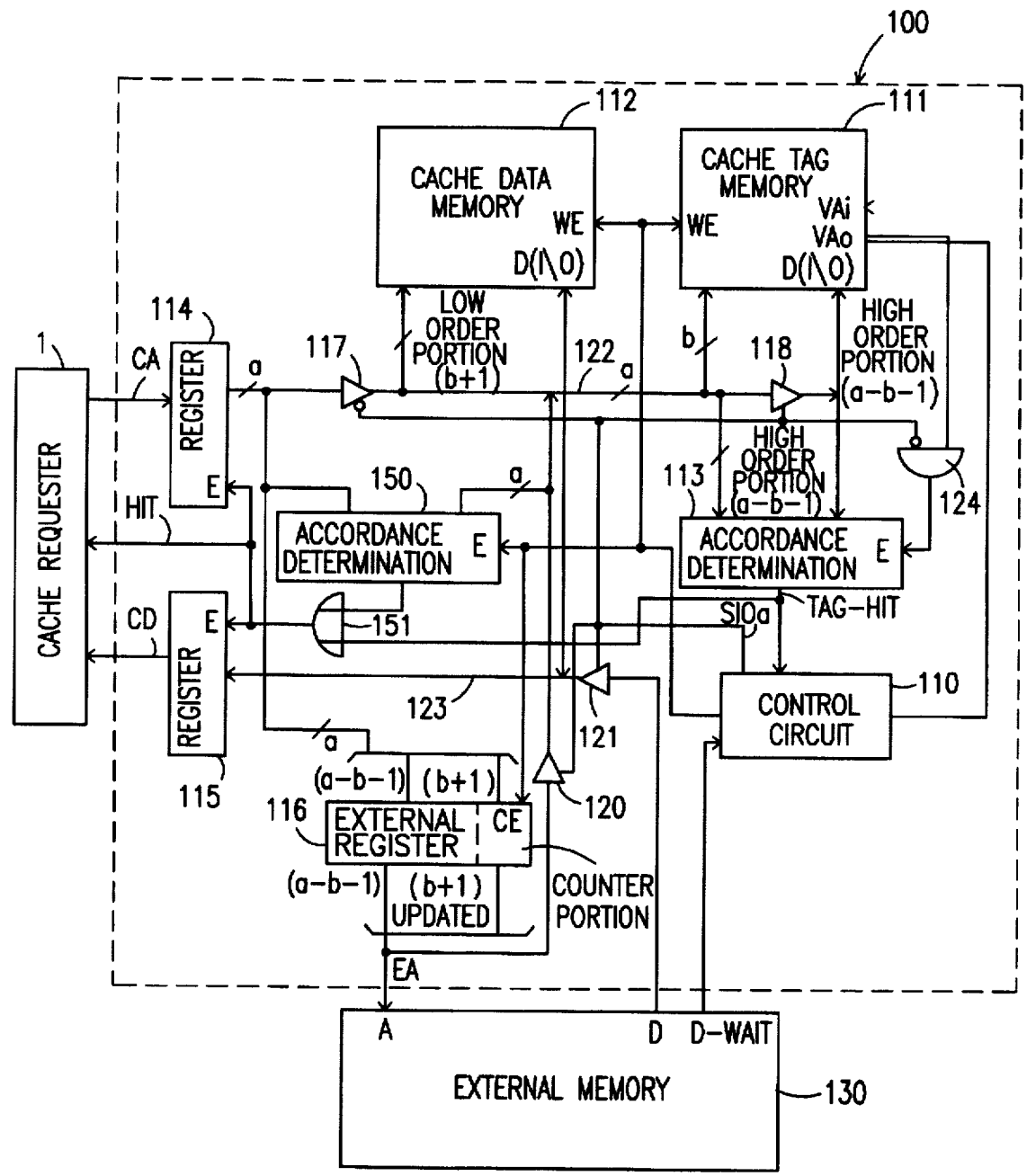
FIG. 1 is a schematic diagram showing a circuit of a cache memory apparatus according to a first embodiment of the present invention.

FIG. 1 is a schematic diagram showing a circuit of a cache memory apparatus according to a first embodiment of the present invention.

Figure 2:
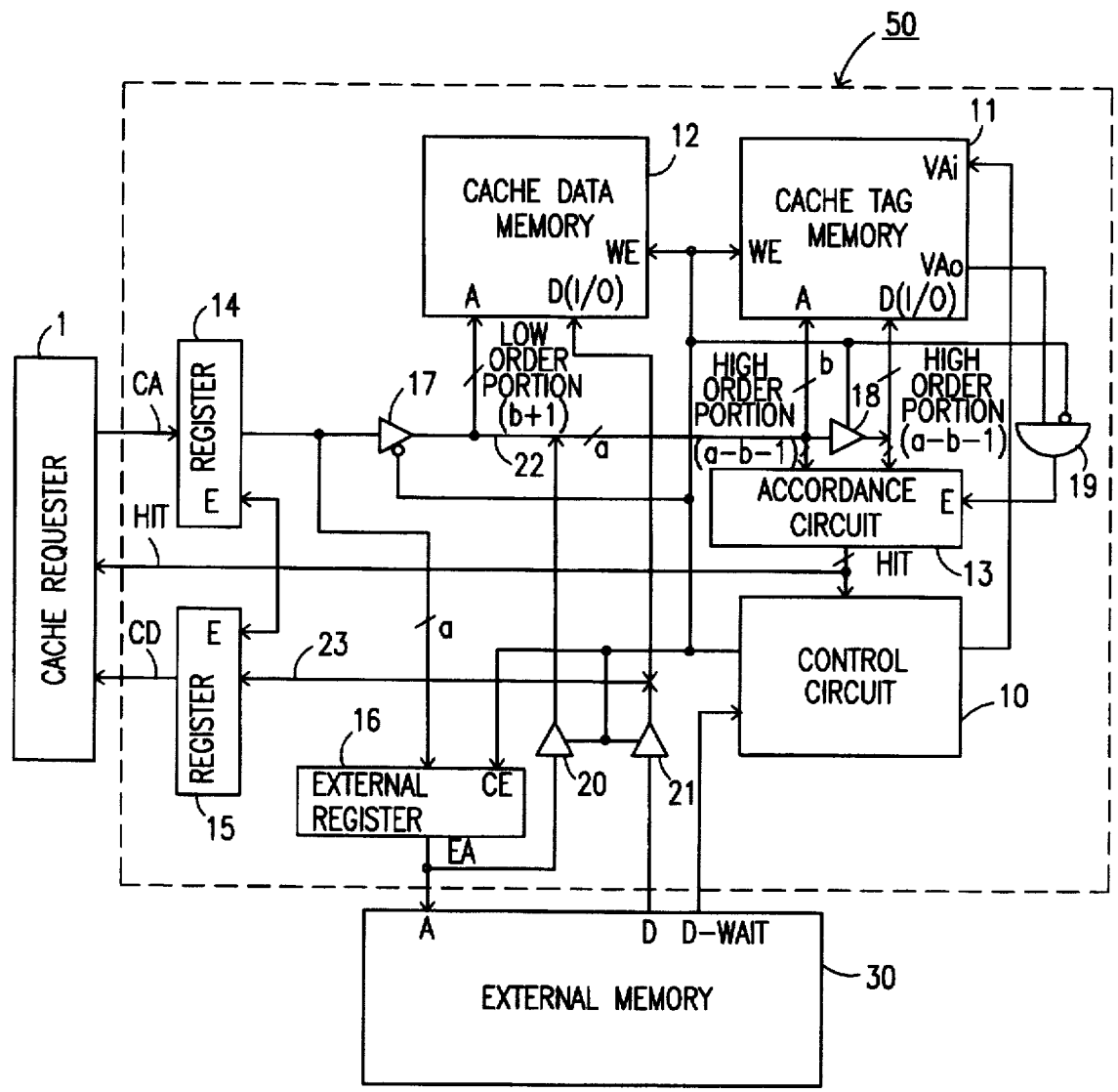
FIG. 2 is a schematic diagram showing a circuit of a cache memory apparatus according to a first related art reference.
Figure 3:
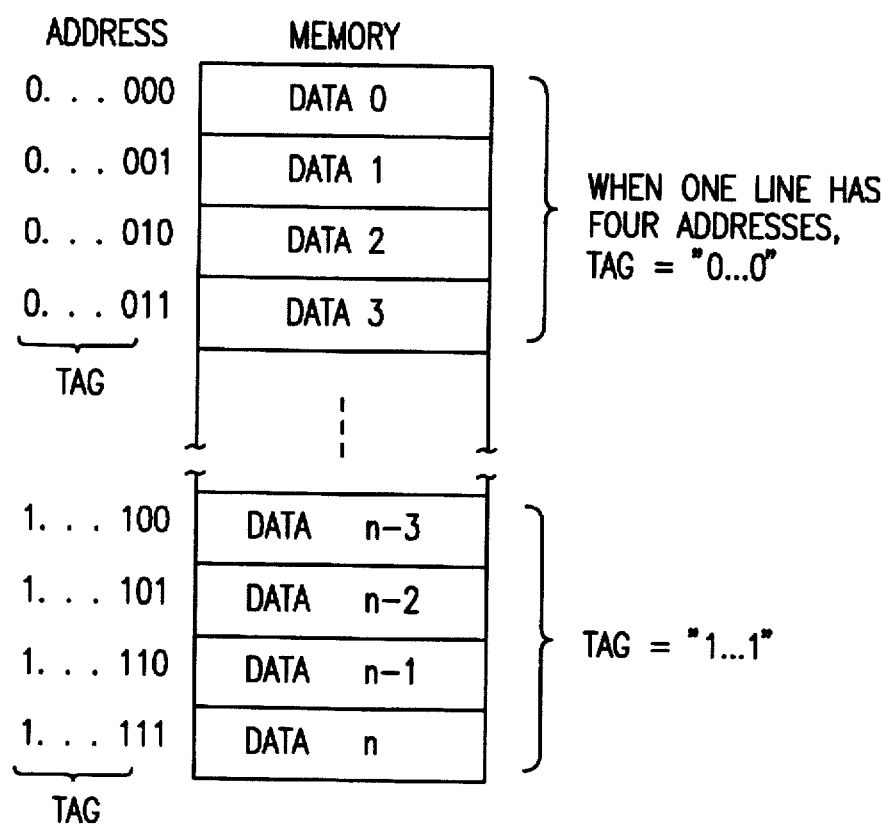
FIG. 3 is a schematic diagram for explaining the content stored in a cache tag memory.
Figure 4:
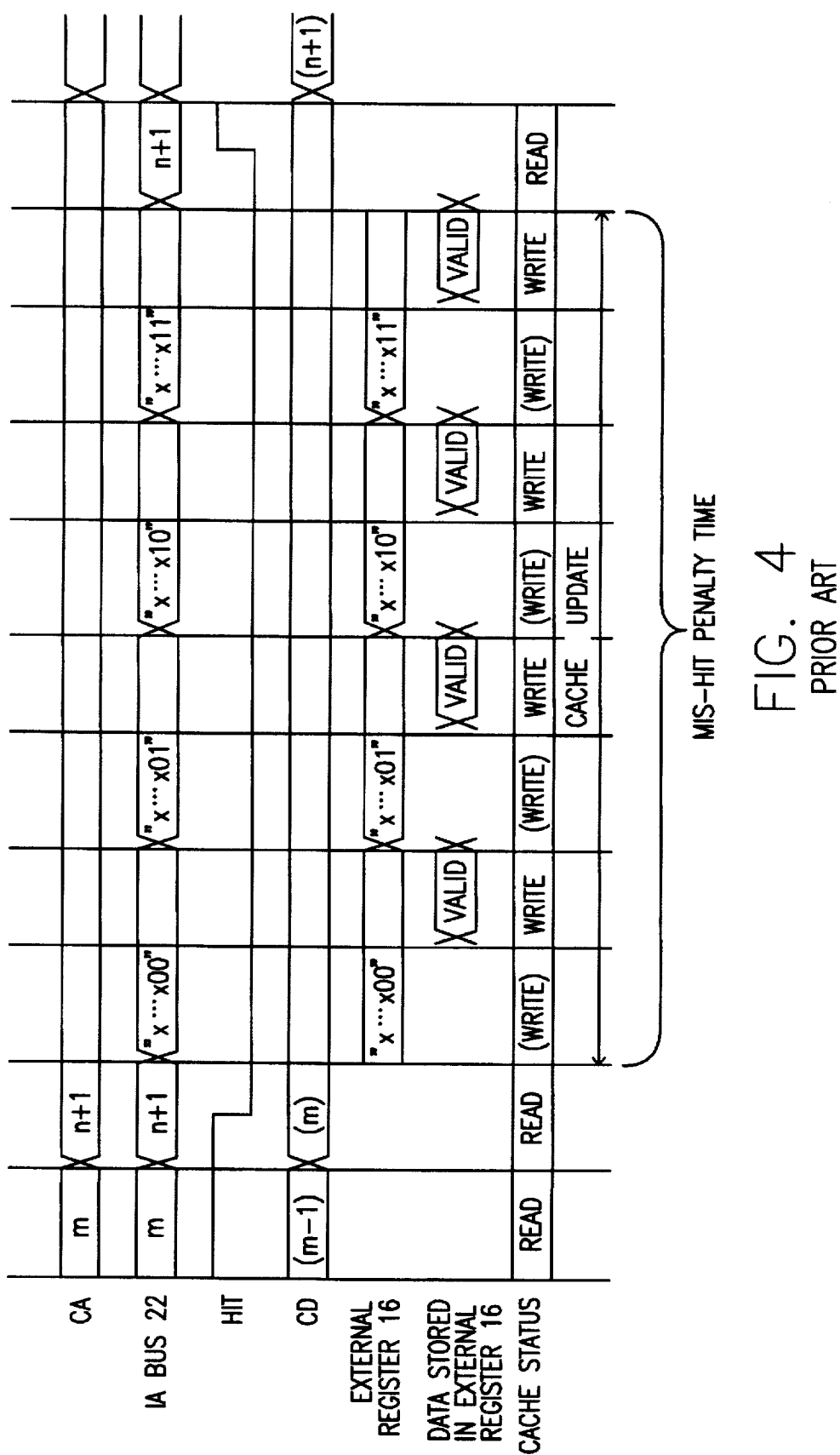
FIG. 4 is a timing chart showing the operation of the cache memory apparatus of FIG. 2.

In FIG. 1, reference numeral 100 is a cache memory apparatus according to the first embodiment of the present invention. The difference between the cache memory apparatus 100 shown in FIG. 1 and the cache memory apparatus 50 shown FIG. 2 is in that the former includes an accordance determining circuit 150 and an OR gate 151. Whenever a cache data memory is updated due to the occurrence of a mis-hit, an enable terminal E of the accordance determining circuit 150 is activated by an output signal of a control circuit 110. Thus, the accordance determining circuit 150 operates. The accordance determining circuit 150 determines whether or not the number of bits a of a cache address CA received from a register 114 accords with addresses of data written from an external memory 130 to a cache memory 112. The OR gate 151 ORes the output of the accordance determining circuit 150 and a tag hit signal TAG-HIT received from the accordance determining circuit 113. When they accord with each other, an enable terminal E of a register 115 is activated.

When a control circuit 110 receives the tag hit signal TAG-HIT from the accordance determining circuit 113, the control circuit 110 outputs a cache update signal S10a so as to turn on tri-state buffers 120 and 121 and output data read from a data output terminal D of the external memory 130 to an ID bus 123. The read data, which is output to the ID bus 123, is supplied to the register 115, which is enabled by the OR gate 151. The output of the register 115 is cache data and supplied to the cache requester 1. In other words, when the cache memory is updated due to the occurrence of a mis-hit, if the accordance determining circuit 150 has determined that two data accord with each other, data that is read from the external memory 130 is bypassed. Instead, the data is supplied as cache data CD to the cache requester 1.

Next, with reference to FIG. 7, the operation of the cache memory apparatus 100 shown in FIG. 1 will be described.

Figure 7:
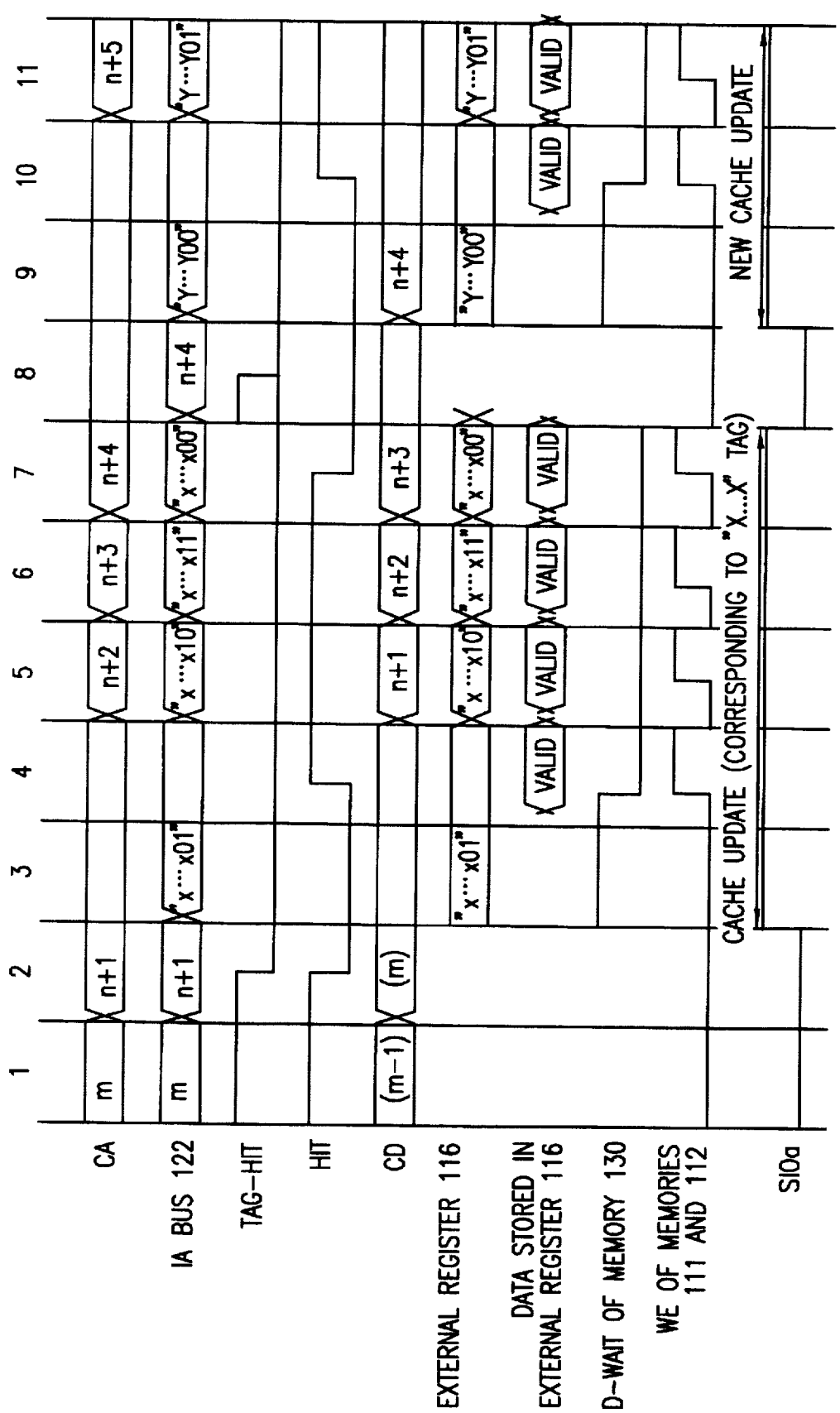
FIG. 7 is a timing chart showing the operation of the cache memory apparatus of FIG. 1.

FIG. 7 is a timing chart showing the operation of the cache memory apparatus 100 shown in FIG. 1. In FIG. 7, it is assumed that n+1="x ... x01" and that n+4="Y ... Y00". In addition, it is assumed that one line has four addresses. The external memory 130 can initially read successive addresses with one wait cycle by burst transmission. When the last write operation is performed, "1" is written to a valid bit. The low order two bits of the external register 116 is a counter that works when a count enable terminal CE is activated.

In FIG. 1, when the cache requester 1 supplies a cache address CA of desired data to the cache memory apparatus 100, the cache address CA is written to the register 114. Unless the cache data memory 112 is being updated, the tri-state buffer 117 is turned on with a cache update signal SIOa that is supplied from the control circuit 110. Thus, the cache address CA stored in the register 114 is supplied to an IA bus 122. The cache address CA comprises "a" bits ("a" being an integral number). The cache data memory 112 receives addresses of a predetermined tag and line from cache address CA comprised of "a" bits on the IA bus 122 (for example, a low order portion (b+1) (a>(b+1) through the address terminal A). Stored data corresponding to the address is supplied to the ID bus through the I/O terminal D.

In addition, to determine whether or not data stored in the cache data memory 112 corresponds to the requested cache address CA, the data stored in the cache tag memory 111 corresponding to the predetermined tag address $Log_2$ (the number of tags)=b is read from the I/O terminal D. The accordance determining circuit 113 determines whether or not the read data accords with the predetermined tag. When the cache data memory 112 is in the read state (namely, not in the cache update state) and the content of the cache tag memory 111 represented by the terminal VAo of the cache data memory 111 is valid, the result of the determination by the accordance determining circuit 113, which is enabled through the AND gate 124, is valid. Thus, the accordance determining circuit 113 supplies a tag hit signal TAG.HIT to the control circuit 110.

At this point, when the accordance determining circuit 113 has determined that both data accord with each other, a hit signal HIT that is output from the OR gate 151 of the tag hit signal TAG-HIT is supplied to the cache requester 101 so as to inform it that the content of the ID bus 123 is valid. The hit signal HIT allows the register 115 to be written. In addition, the hit signal HIT allows data to be written to the register 114 so as to receive a next cache address from the cache requester 1. On the other hand, when the tag hit signal TAG-HIT, which is output from the accordance determining circuit 113, represents that both data do not accord with each other, a mis-hit takes place. In this case, at the next cycle, the cache data memory 112 is updated.

When the cache data memory 112 is in update state, the control circuit 110 issues a cache update signal SIOa to the tri-state buffers 120 and 121 so that they are turned on. Thus, data can be received from the external memory 130. In addition, the control circuit 110 activates the count enable terminal CE of the external register 116, which is an address supply source to the IA bus 122, so as to change the read data supply source of the ID bus 123 to the external memory 130. Whenever a mis-hit takes place, the content of the external register 116 is always updated.

At this point, the signal level of a terminal D-WAIT of the external memory 130, which represents that the external read data is in a valid timing, becomes "L" level. In addition, the signal level of the cache update signal SIOa, which is output from the control circuit 110, is in "H" level. Thus, the control circuit 110 activates write enable terminals WE of the cache tag memory 111 and the cache data memory 112 at predetermined intervals. Since the low order two bits of the external register 116 works as a counter, when the write enable terminals WE of the cache tag memory 111 and the cache data memory 112 are activated, a count enable terminal CE of the external register 116 is activated, thereby counting up the counter.

This operation is repeated n times (for example, four times). Thus, all data of line addresses where a mis-hit took place are updated. Data is read from the data output terminal D of the external memory 130. The read data is supplied to an I/O terminal D of the cache data memory 112 through the tri-state buffer 121. Thus, the cache data memory 112 is updated. The control circuit 110 issues a signal that represents that only the fourth operation is valid and supplies this signal to a terminal VAi of the cache tag memory 111. The cache update operation in this embodiment is the same as that of the cache memory apparatus 50 according to the first related art reference shown in FIG. 2.

In this embodiment, in addition to the above-described cache update operation, while cache data is being updated, when write data to be written to the cache data memory 112 is requested by the cache requester 1, the write data is bypassed to the cache requester 1. In other words, while cache data is being updated, the output of the control circuit 110 causes the accordance determining circuit 150 to be enabled. The accordance determining circuit 150 determines whether or not the content of the register 114 accords with the content of the external register 116. The output of the accordance determining circuit 150 and the tag hit signal TAG-HIT, which is supplied from the accordance determining circuit 150, are supplied to the OR gate 151. The output of the OR gate 151 is a hit signal HIT. The hit signal HIT is supplied to the cache requester 1. In addition, the register 115 is enabled. Thus, data read from the external memory 130 to the ID bus 123 is supplied to the cache requester 1.

This operation is described with reference to FIG. 7. If a mis-hit takes place at n+1 of a cache address CA at clock period 2, the cache memory apparatus 100 updates the cache tag memory 111 and the cache data memory 112. At this point, the signal TAG-HIT becomes "L" state that represents that the accordance determining circuit 113 has determined that the data stored in the register 114 does not accord with data stored in the cache data memory 112. At clock period 3, the control circuit 110 enables the accordance determining circuit 150 and the external register 116 corresponding to the signal state of the TAG-HIT. In addition, the control circuit 110 causes the cache tag memory 111 and the cache data memory 112 to be in a write enable state. The cache address CA ("x ... x01") is directly supplied in the external register 116. Address data EA is input to the accordance determining circuit 150 corresponding to the cache address CA and the cache address supplied to the external register 116. At this point, the low order two bits of the external register 116 works as a counter. In addition, whenever one line is written to the cache memories 111 and 112, the counter counts up by 1. Thus, the address data EA at clock period 4 is "x...x01". At clock periods 5, 6, and 7, the address data EA are "x...x10", "x...x11", and "x...x00", respectively. Thus, at clock period 4, the accordance determining circuit 150 determines that the cache address CA accords with the address data EA. Consequently, the accordance determining circuit 150 enables the registers 114 and 115. The external memory 130 outputs data corresponding to the address data EA "x...x01" generated by the external register 116. The output of the external memory 130 is cache data CD and supplied to the cache requester 101 through the register 115. In addition, the cache data CD is written to the cache data memory 112. Since the register 114 is enabled, the cache requester 1 supplies n+2 ("x...x10") as the next cache address CA to the register 114. At clock period 5, the cache memory apparatus 100 updates cache data of the line including n+1. In other words, the cache memory apparatus 100 updates data corresponding to the address data "x...x10", which is generated by the external register 116, and writes it to the cache data memory 112. Since the register 114 has stored n+2 and the cache tag memory 111 has not stored tag "x...x", the accordance determining circuit 113 does not determine that they accord with each other. However, since the accordance determining circuit 150 and the external register 116 are kept in enable state, n+2 of the cache address CA is supplied to the accordance determining circuit 150. At this point, since the accordance determining circuit 150 has received the same address data as n+2 from the other input, it determines that two data accord with each other, thereby causing the registers 114 and 115 to be kept in enable state. The data corresponding to n+2 of the cache address CA requested by the cache requester 1 is supplied to both the cache data memory 112 and the cache requester 1 through the register 115. Since the register 114 is in enable state, the cache requester 1 supplies n+3 ("x x 11") as the next cache data CA. Since n+3 is address data that is preceded by n+2, at clock period 6, the same operation as that at the clock period 5 is performed. However, at clock period 7, n+4 ("Y...Y00") of the cache address CA is input. n+4 accords with tag stored in the cache tag memory 111. However, n+4 does not accord with the address data "x...x00" for which the fourth write operation is performed. Thus, the enable states of the registers 114 and 115 are cancelled. At this point, "x...x00" as the address data EA is supplied to the external memory 130. In addition, data corresponding to the address data "x...x00" has been supplied to the cache data memory 112 and the register 115, data corresponding to "x...x00" as the cache data CD is supplied to the cache requester 1 through the register 115. At clock period 7, "x...x" is written to the cache tag memory 111. At clock period 8, the same operation as that at clock period 2 is performed. When two tags do not accord with each other, at clock period 9 or later, the above-described update operation is performed.

Second Embodiment

Figure 8:
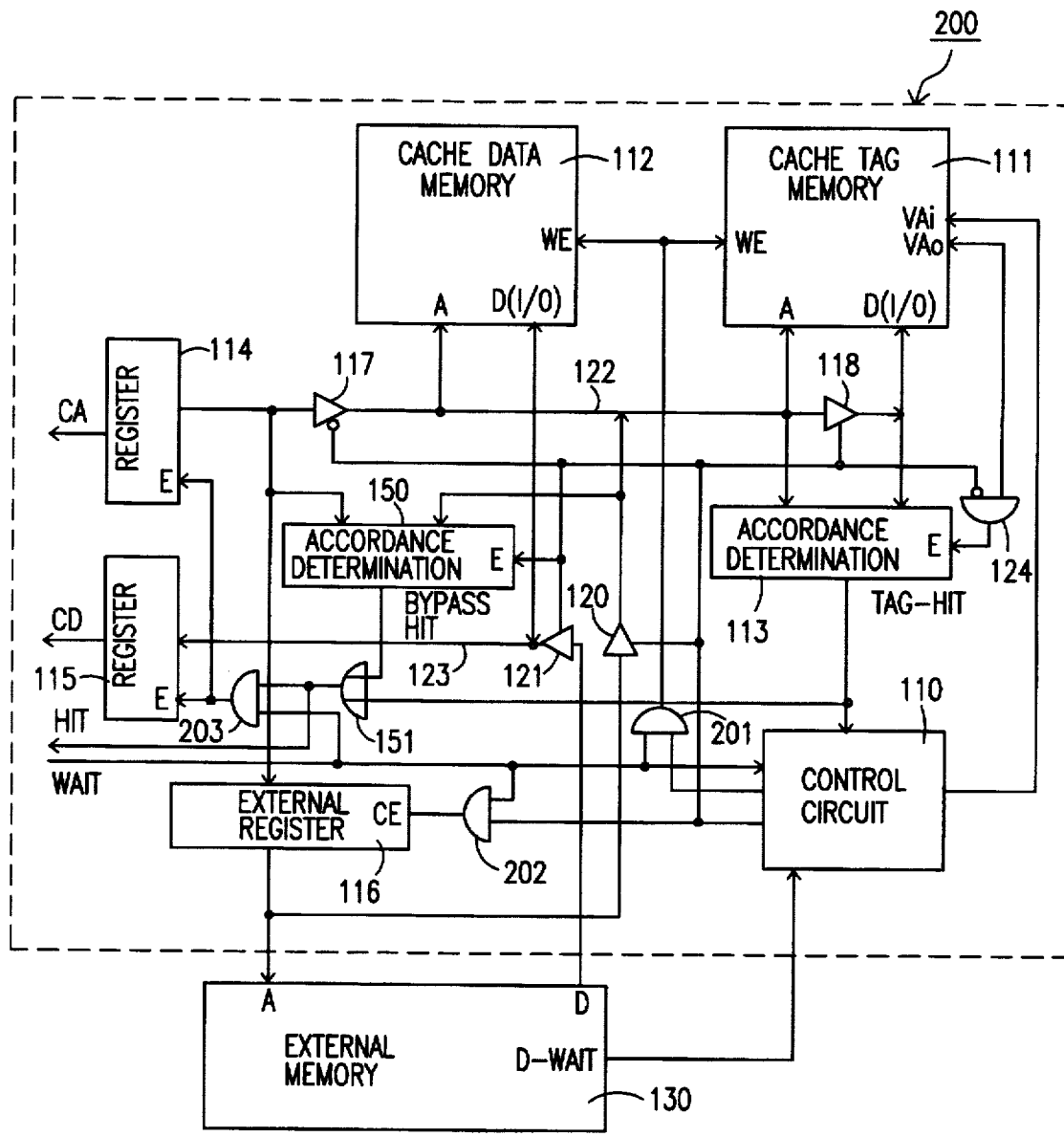
FIG. 8 is a schematic diagram showing a circuit of a cache memory apparatus according to a second embodiment of the present invention.

FIG. 8 is a schematic diagram showing a circuit of a cache memory apparatus according to a second embodiment of the present invention. In FIG. 8, reference numeral 200 is the cache memory apparatus. The cache memory apparatus 200 according to the second embodiment differs from the cache memory apparatus 100 according to the first embodiment in that a cache data update operation can be suspended corresponding to a wait request issued by a cache requester 1. Unlike with the cache memory apparatus 100 according to the first embodiment, the cache memory apparatus 200 includes three AND gates 201, 202, and 203. The AND gate 201 ANDes a signal that represents a wait request state issued by the cache requester 1 and an output signal of the control circuit 110 and outputs write enable terminals WE of a cache tag memory 111 and a cache data memory 112. In other words, when the cache requester 1 has not issued a wait request and write requests are issued to the cache tag memory 111 and the cache data memory 112, the AND gate 201 activates the write enable terminals WE of the cache tag memory 111 and the cache data memory 112. On the other hand, the AND gate 202 ANDes the signal representing the wait request state issued by the cache requester 1 and the output signal of the control circuit 110 and inputs the resultant signal to a count enable terminal CE of an external register 116. In other words, when the cache requester 1 has not issued a wait request and a request for incrementing the count of the external register 116 by 1 is issued, the AND gate 202 activates the count enable terminal CE of the external register 116. The AND gate 203 ANDes the signal representing the wait request issued by the cache requester 1 and an output signal of an OR gate 151 (namely, a signal representing HIT state of cache data) and inputs the resultant signal to enable terminals E of registers 114 and 115. In other words, when the cache requester 1 has not issued a wait request and cache address CA accords with tag stored in the cache tag memory 111 or the cache address CA accords with data stored in the external register 116, the AND gate 203 activates the enable terminals E of the registers 114 and 115. When the cache requester 1 issues a wait request, data write to the cache tag memory 111 and the cache data memory 112, data address output to the external register 116 corresponding to read request by the external register 116, and storage of the cache data CD in the register 115 are prohibited. Thus, the entire update operation of cache data in the cache memory apparatus 200 is suspended (in wait state).

Figure 9:
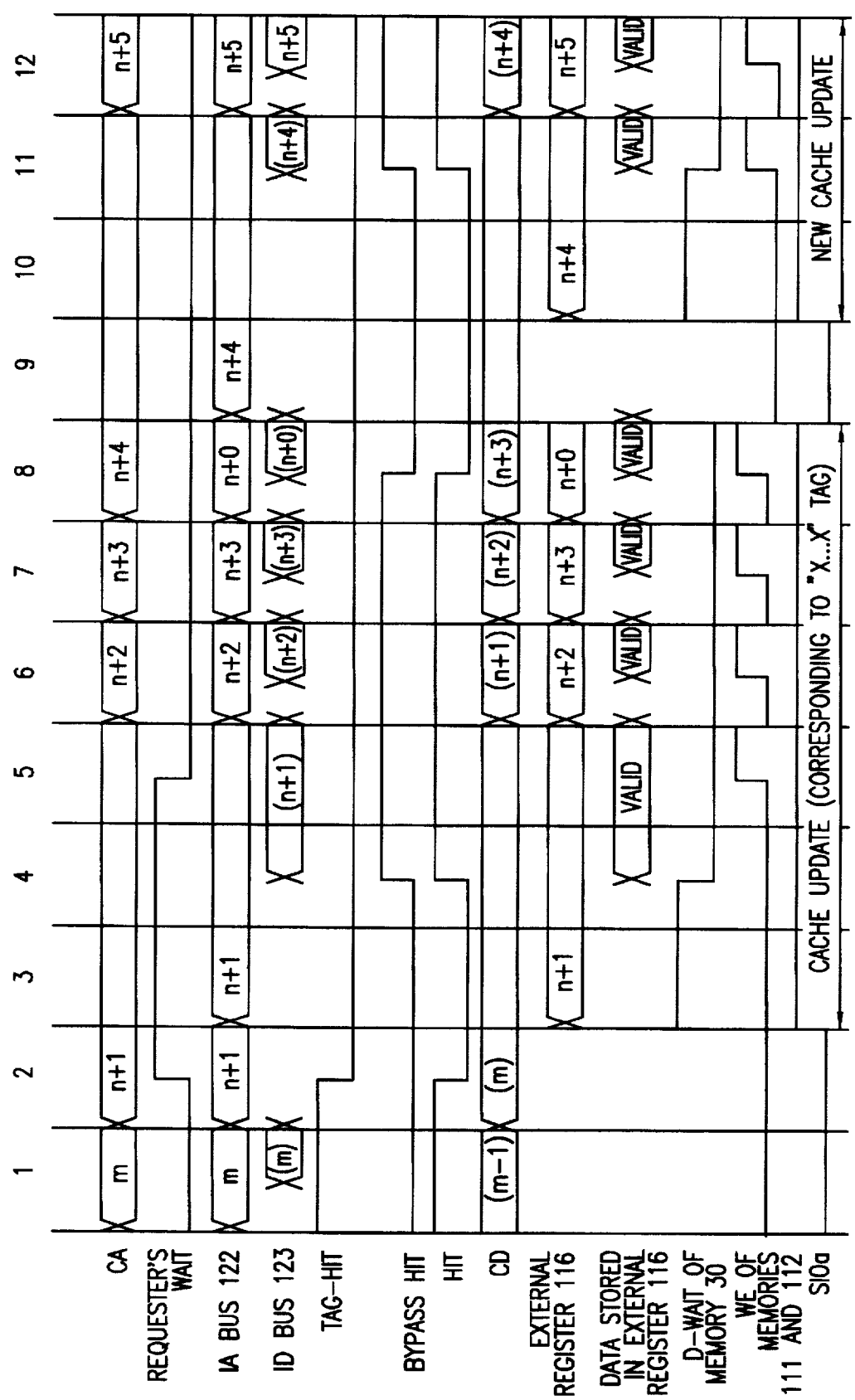
FIG. 9 is a timing chart showing the operation of the cache memory apparatus of FIG. 8.

Next, with reference to FIG. 9, the operation of the cache memory apparatus 200 shown in FIG. 8 will be described. FIG. 9 is a timing chart showing the operation of the cache memory apparatus 200 of FIG. 8.

In FIG. 9, in clock periods 2 to 4 in which the cache requester 1 has issued a wait request, the registers 114 and 115 are inactivated. In these periods, the registers 114 and 115 store cache addresses CA =n+1 and cache data CD=m, respectively. In addition, the external register 116 stores n+1. Since the signal levels of the write enable terminals WE of the cache tag memory 111 and the cache data memory 112 are in "L" level, they are not activated.

Third Embodiment

Figure 10:
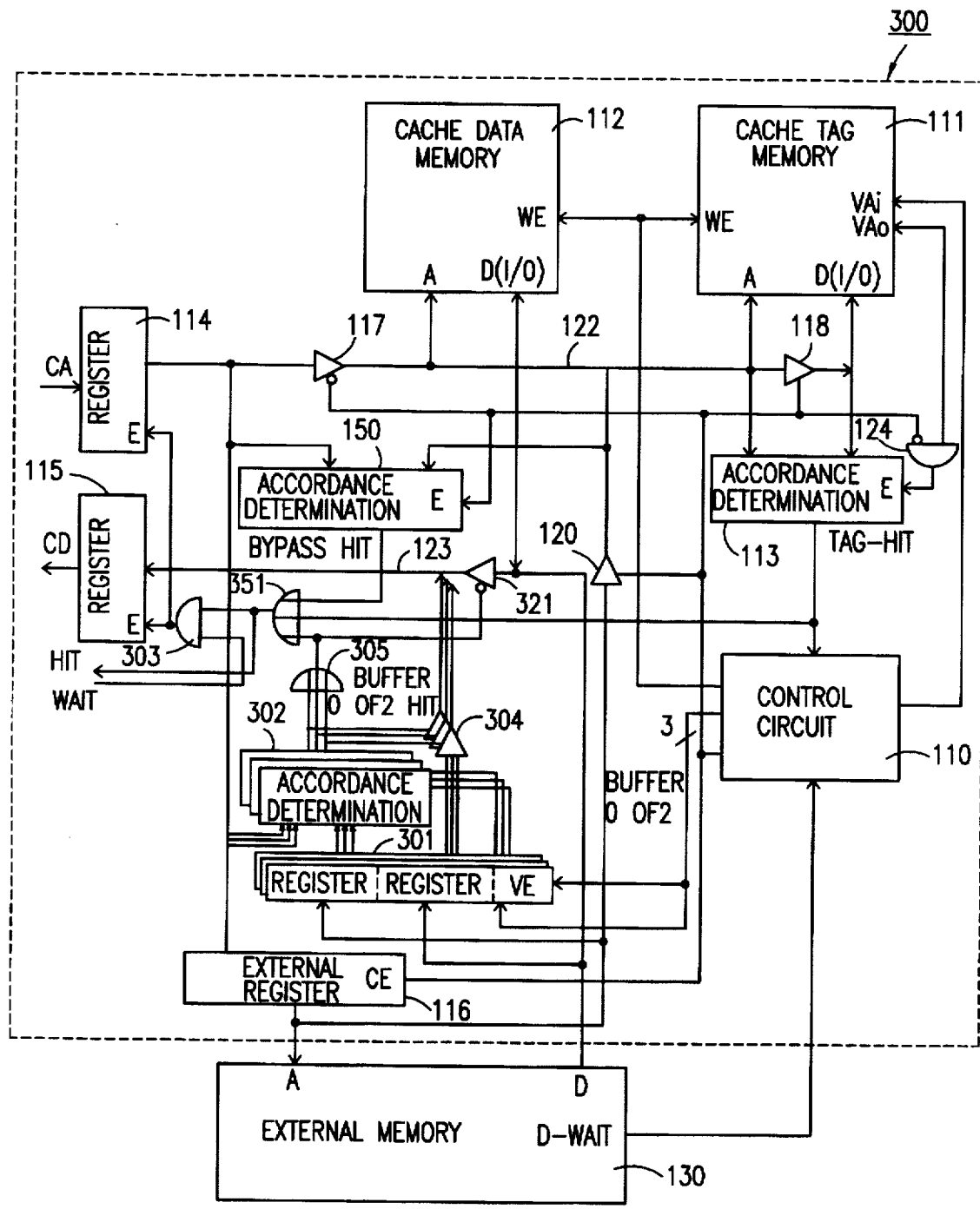
FIG. 10 is a schematic diagram showing a circuit of a cache memory apparatus according to a third embodiment of the present invention.

FIG. 10 is a schematic diagram showing a circuit of a cache memory apparatus according to a third embodiment of the present invention. In FIG. 10, reference numeral 300 is a cache memory apparatus according to the third embodiment. The difference between the cache memory apparatus according to the third embodiment and the cache memory apparatus 100 according to the first embodiment is that in the third embodiment although cache data is updated corresponding to a wait request issued by a cache requester 1, data updated in wait state can be easily accessed. The cache memory apparatus 300 comprises a plurality of buffers 301, a plurality of accordance determining circuits 302, a plurality of tri-state buffers 304, a tri-state buffer 321, an AND gate 303, and OR gates 305 and 306. The accordance determining circuits 302 correspond to the accordance determining circuits. The tri-state buffers 304 correspond to the buffers 301. The registers 301 each store a set of address and data read from an external memory 130 and a valid flag that is a signal output from a control circuit 110. An output signal of the control circuit 110 is input to an enable terminal E of the buffer 301. Thus, the buffer 301 is activated. In this embodiment, three buffers 301 (buffers 301-1, 301-2, and 301-3) are provided. Since one line has four addresses and cache data is updated, line by line, with three buffers 301, data can be properly updated. However, it should be noted that the number of the buffers 301 is not limited to 3. The number of the accordance determining circuits 302 in this example, is three corresponding to the three buffers 301. Each of the accordance determining circuits 302 is activated with a valid flag signal V received from the corresponding buffer 301. Each of the accordance determining circuits 302 determines whether or not a cache address CA received from the register 114 accords with an address stored in the corresponding buffer 301. The output signal of the accordance determining circuit 302 controls the corresponding tri-state buffer 304. In addition, the output signal of the accordance determining circuit 302 is supplied to the OR gate 305. The OR gate 305 ORes the output signals of the accordance determining circuits 302 and inputs the resultant signal to the OR gate 351. In addition, with an inverted signal of the output signal of the OR gate 305, the operation of the tri-state buffer 321 is controlled. The number of the tri-state buffers 304 is three corresponding to three accordance determining circuits 302. Each of the tri-state buffers 304 is controlled by the output signal of the corresponding accordance determining circuits 302.

Data stored in each of the buffers 301 is output to an ID bus 123. Each of the tri-state buffers 321 outputs data stored in the external memory 130 to the ID bus 123 corresponding to an inverted signal of the output signal of the OR gate 305. The OR gate 351 is a three-input type OR gate where the output of the OR gate 305 and the results of the accordance determining circuits 113 and 150 are input. The output signal of the OR gate 351 is supplied to the AND gate 303. In addition, a wait signal WAIT received from the cache requester 1 is supplied to the AND gate 303. The AND gate 303 ANDes the output signal of the OR gate 351 and the wait signal WAIT and inputs the resultant signal to enable terminals E of registers 114 and 115.

Figure 11:
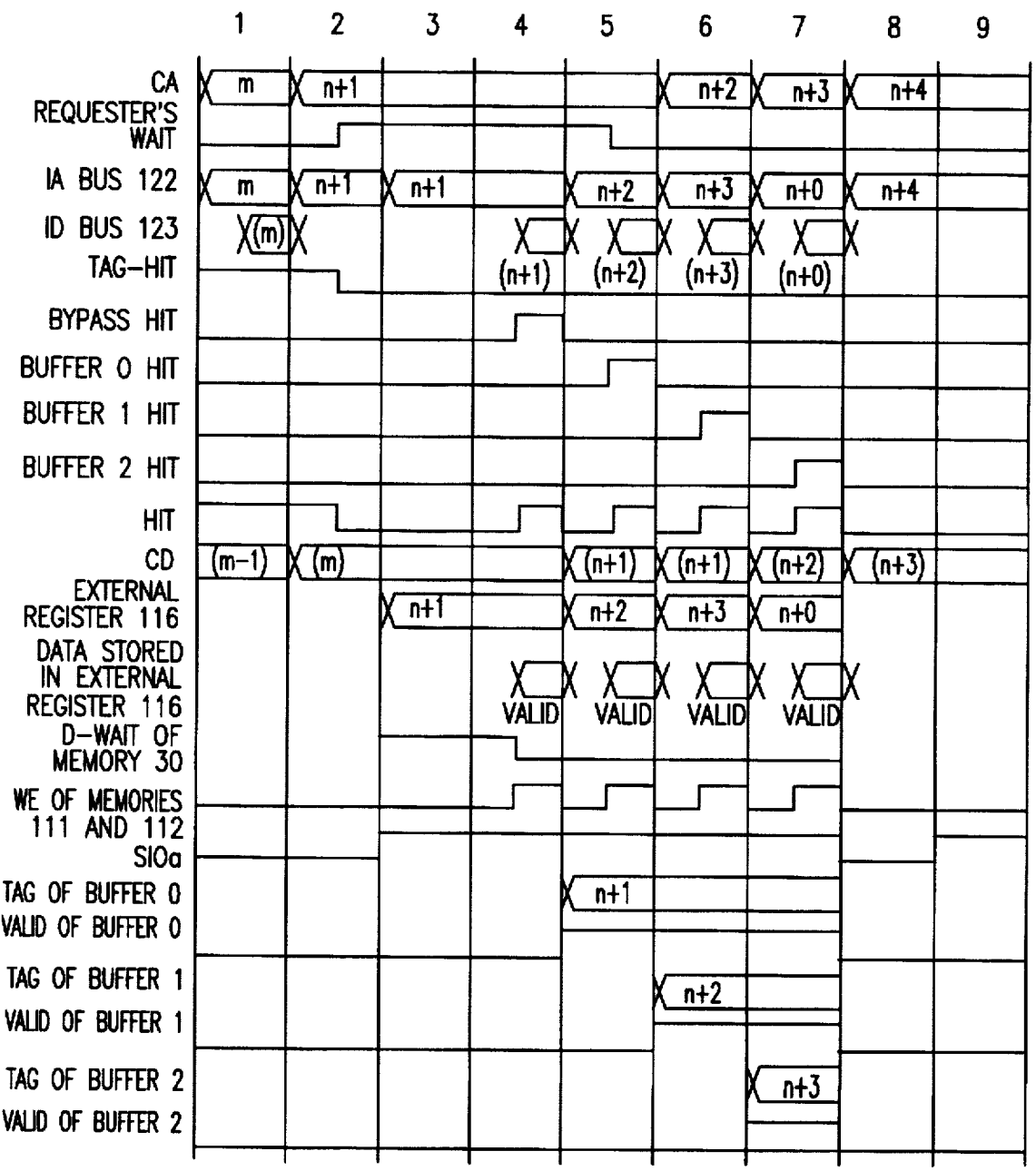
FIG. 11 is a timing chart showing the operation of the cache memory apparatus of FIG. 10.

Next, with reference to FIG. 11, the operation of the cache memory apparatus 300 shown in FIG. 10 will be described. FIG. 11 is a timing chart showing the operation of the cache memory apparatus 300 of FIG. 10.

In FIG. 11, at clock period 2, a mis-hit (TAG HIT is "0") takes place. Thus, the cache memory apparatus 300 starts the update operation of cache data. However, at clock period 2, the cache requester 1 is in wait state. In the second embodiment, while the cache requester 1 is in wait state, the cache data update operation is not performed. However, in the third embodiment, at clock period 4, while the cache requester 1 is in the wait state, when data of the external memory 130 is output, the data is written to a cache data memory 112. In addition, the data is supplied to the register 115 through the tri-state buffer 321. At clock period 4, since the cache requester 1 is still in wait state, it does not receive the cache data stored in the register 115. However, at clock period 4, with an output signal of the control circuit 110, one of the buffers 301 (for example the buffer 301-0) is activated so as to store an address and corresponding data, which are output from the external memory 130. In addition to the address and data, the output signal of the control circuit 110 causes a valid flag to become valid. At clock period 5, the cache requester requests the same address as it did at clock period 4. At this point, since the required address and data have been stored in the register 301 at clock period 4, one of the accordance determining circuits 302 determines that two data accord with each other. Thus, the accordance determining circuit 302 inactivates the tri-state buffer 321 through the OR gate 305. Consequently, data of the required address is output from the register 301 (buffer 301-0) to the ID bus 123. At this point, data corresponding to the next address is written to the cache data memory 112. In addition, the same address and data are written to the buffer 301 (for example, buffer 301-1). Thus, although an address issued by the cache requester 1 differs from a write timing to the cache data memory 112, cache data CD are supplied from the buffers 301 (for examples, buffers 301-1 and 301-22) to the cache requester 1.

Fourth Embodiment

Figure 12:
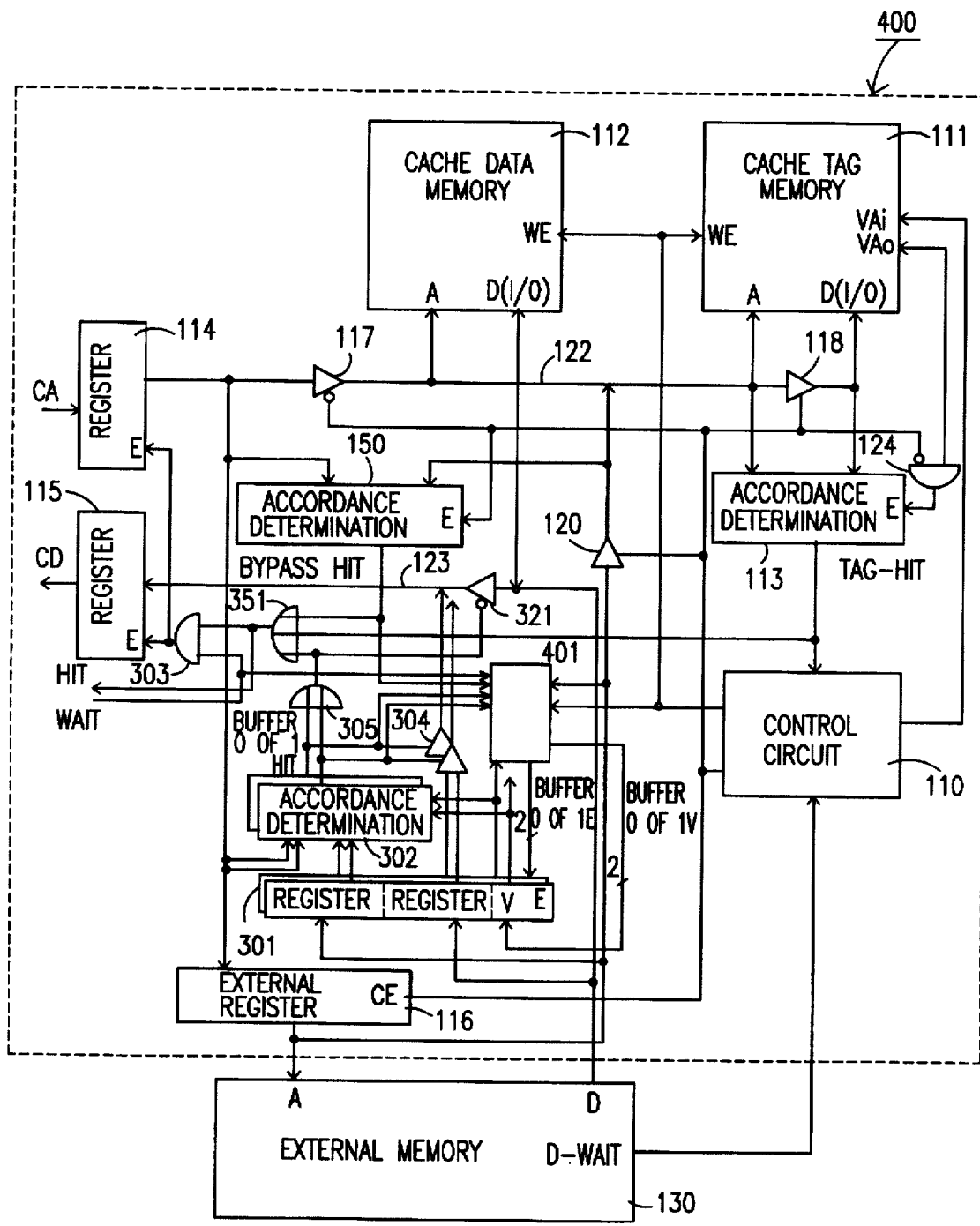
FIG. 12 is a schematic diagram showing a circuit of a cache memory apparatus according to a fourth embodiment of the present invention.

FIG. 12 is a schematic diagram showing a circuit of a cache memory apparatus according to a forth embodiment of the present invention. In FIG. 12, reference numeral 400 is the cache memory apparatus according to the fourth embodiment. The difference between the cache memory apparatus 400 according to the fourth embodiment and the cache memory apparatus 300 according to the third embodiment is in that an address and data are written to a buffer 301 when necessary.

Unlike with the cache memory apparatus according to the third embodiment, the cache memory apparatus 400 includes a buffering monitor circuit 401. The buffering monitor circuit 401 determines whether or not cache data to be updated should be stored in the buffer 301 while a cache requester 1 is in wait state. The buffering monitor circuit 401 stores the resultant data in predetermined buffers 301 (in this example, buffers 301-1 and 301-2 as shown in FIG. 12). In addition, the buffering monitor circuit 401 invalidates data that is not necessary. The buffering monitor circuit 401 receives a wait signal WAIT, output signals (determined results) of accordance determining circuits 150 and 302, an output of an external register 116, and an output signal of a control circuit 110. The output signal of the control circuit 110 activates write enable terminals of a cache tag memory 111 and a cache data memory 112. The buffering control circuit 110 outputs a signal that activates the buffer 301 and a valid flag that represents the validity of data stored in the buffer 301.

Figure 13:
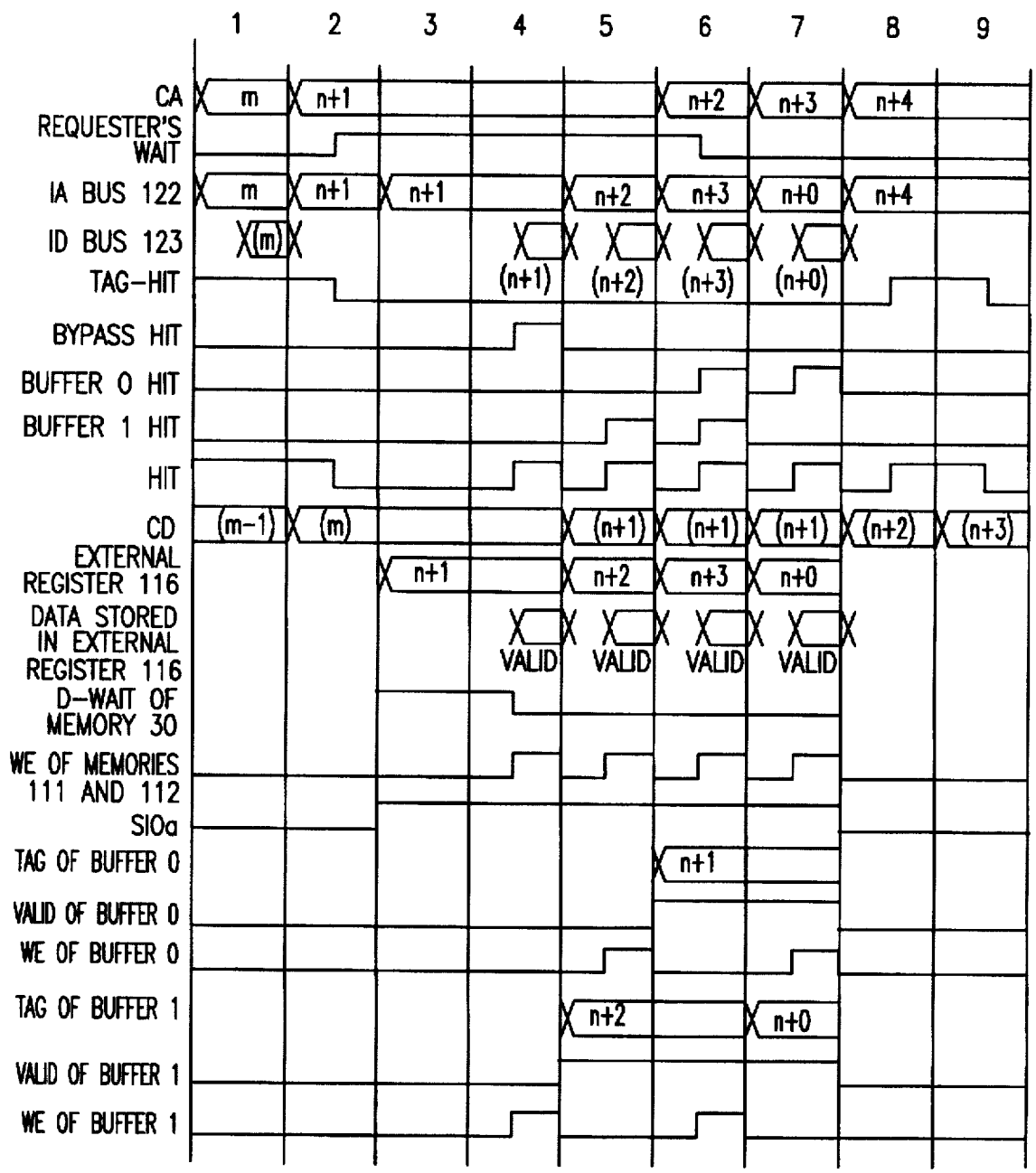
FIG. 13 is a timing chart showing the operation of the cache memory apparatus of FIG. 12.

Next, with reference to FIG. 13, the operation of the cache memory apparatus 400 shown in FIG. 12 will be described. FIG. 13 is a timing chart showing the operation of the cache memory apparatus 400 of FIG. 12.

In the buffering monitor circuit 401, there are conditions for storing data to the buffers 301 (buffers 301-0 and 301-1) and for invalidating data stored in the buffers 301.

(1) The conditions for storing data to the buffer 301-0 include: the low order one bit of the address of data written to the cache data memory is 0;

data stored in the buffer 301-0 is invalid; and the cache requester 1 is in wait state while a bypass hit takes places, or the cache requester 1 is in wait state while a hit takes place in the buffer 301-1.

(2) The conditions for storing data to the buffer 301-1 include the low order one bit of the address of data written to the cache data memory is 0;

data stored in the buffer 301-1 is invalid; and the cache requester 1 is in wait state while a bypass hit takes place, or the cache requester 1 is in wait state while a hit takes place in the buffer 301-0.

(3) The conditions for invalidating data stored in the buffer 301-0 include the low order one bit of the address of data written to the cache data memory is 0; and the cache requester 1 is not in wait state while a bypass hit takes place or a hit takes place in the buffer 301-0.

(4) The conditions for invalidating data stored in the buffer 301-1 include the low order one bit of the address of data written to the cache data memory is 1; and the cache requester 1 is not in wait state while a bypass hit takes place or a hit takes place in the buffer 301-1.

At clock period 2, a mis-hit takes place and thereby the cache data memory 112 is updated. At clock period 4, data n+1 takes place on an ID bus 123 where data is read from an external memory 130 (namely, a bypass hit takes place). At clock period 4, the cache requester 1 is in wait state. When the low order one bit of the address data n+1 is for example "0", the above-described condition (1) is satisfied. Thus, the data n+1 is written to the buffer 301-0. At clock period 5, a hit takes place in the buffer 301-0 while the cache requester 1 is in wait state. Thus, the data stored in the buffer 301-0 is not invalidated. However, since the conditions (2) are satisfied (namely, since the low order one bit of the data n+1 is "0", the low odder one bit of the next data n+2 is "1"), data n+2 is written to the buffer 301-1. When the above-described conditions (1) to (4) are satisfied, new data is written or invalidated.

Fifth Embodiment

Figure 14:
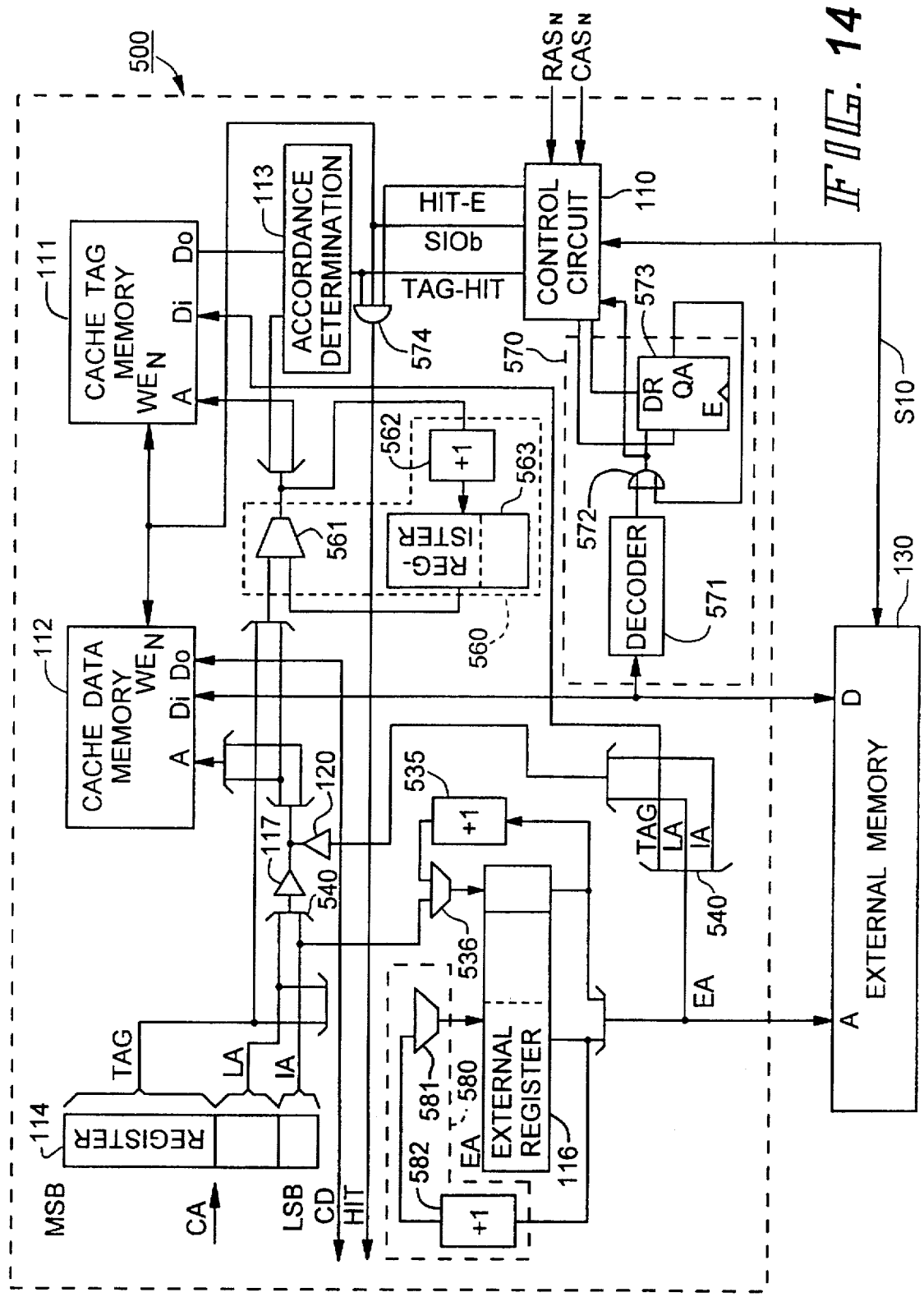
FIG. 14 is a schematic diagram showing a circuit of a cache memory apparatus according to a fifth embodiment of the present invention.

FIG. 14 is a schematic diagram showing a circuit diagram of a cache memory apparatus according to a fifth embodiment of the present invention. For the simplicity, the same constructional portions as the cache memory apparatus 100 shown in FIG. 1 are denoted by the same reference numerals.

Figure 5:
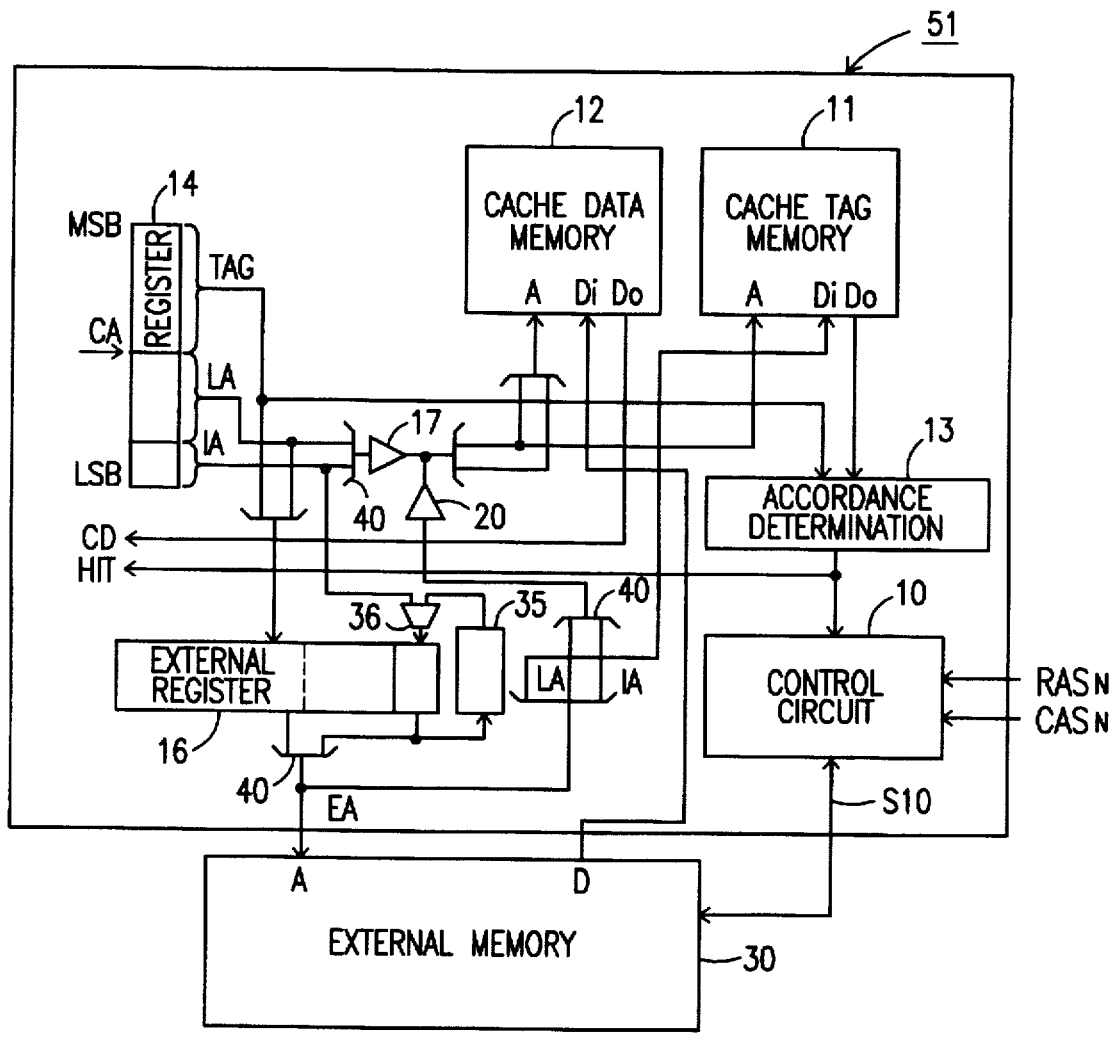
FIG. 5 is a schematic diagram showing a circuit of a cache memory apparatus according to a second related art reference.
Figure 6:
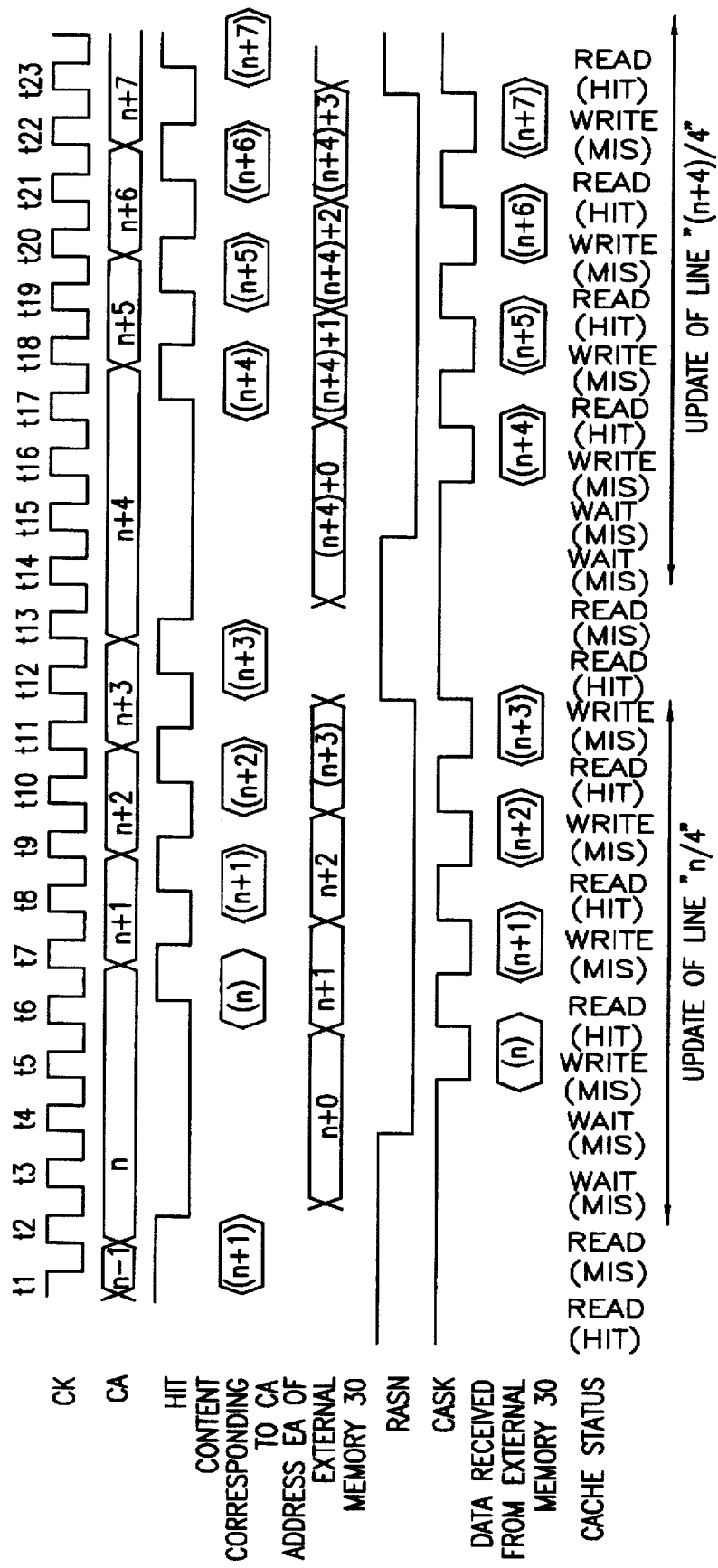
FIG. 6 is a timing chart showing the operation of the cache memory apparatus of FIG. 5.

As with the cache memory apparatus shown in FIG. 5, the cache memory apparatus 500 according to the fifth embodiment works as a command cache memory disposed in a command generating portion of an MPU or the like. The cache memory apparatus 500 includes a mis-hit determining means 560, a necessity determining means 570, an updating means 580, and an AND gate 574. The mis-hit determining means 560 determines whether or not a mis-hit takes place in the next line address of a line address with a mis-hit when the cache memory is in wait state while the cache memory is being updated. The necessity determining means 570 determines whether or not data (command) that has been read in the cache memory update state is necessary (namely, whether or not a branch command is present). The updating means 580 updates the next line address when a mis-hit takes place in the next line address and the content thereof is necessary (namely, when a branch command is not present).

The mis-hit determining means 560 comprises a selector 561, an adder 562, and a register 563. The selector 561 is connected to the output side of a register 114. The adder 562 increments the output of the selector 561 by +1. The register 563 supplies the output of the adder 562 to the selector 561. The necessity determining means 570 comprises a decoder 571, an OR gate 572, and a flag 573. The decoder 571 decodes data read from an output terminal D of an external memory 130. The OR gate 572 ORes the output of the decoder 571. The flag 573 is constructed of a delay-type flip-flop that temporarily stores the output of the OR gate 572. The AND gate 574 ANDes a tag hit signal TAG-HIT, a signal HIT-E, and a write enable signal SIOb. The tag hit signal TAG-HIT is output from an accordance determining circuit 113. The signal HIT-E is output from a control circuit 110. The write enable signal SIOb is output from the control circuit 110. The write enable signal SIOb activates inverted write enable terminals $WE_N$ of a cache tag memory 111 and a cache data memory 112. The updating means 580 comprises a selector 581 and an adder 582. The selector 581 selects the output of the register 114 so as to update the content of an external register 116. The adder 582 increments the output of the external register 116 by +1 and feeds back the resultant data to the selector 581. In FIG. 14, reference numeral 540 is a connecting state.

Next, with reference to FIG. 15, the operation of the cache memory apparatus 500 shown in FIG. 14 will be described.

Figure 15:
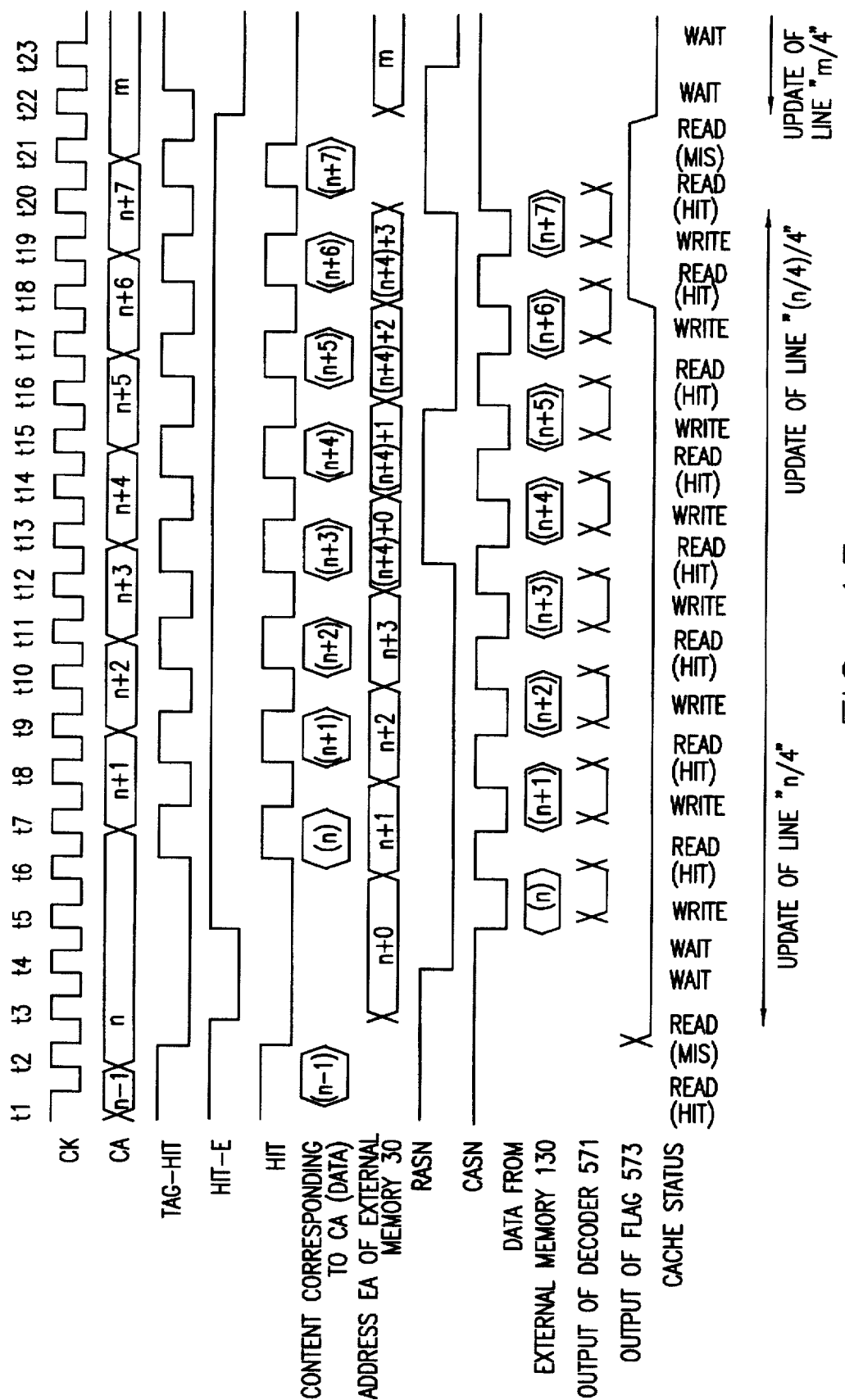
FIG. 15 is a timing chart showing the operation of the cache memory apparatus of FIG. 14.

FIG. 15 is a timing chart showing the operation of the cache memory apparatus 500. In FIG. 15, n represents that the low order two bits are "00". In the timing chart, it is assumed that commands at addresses n to n+5 and address n+7 are not branch commands, but that a command at address n+6 is a branch command. The branch type on the cache address request side that uses the cache memory (for example, a CPU) is of a delay-branch type. A branch command at address n+6 is branched to m. Thus, commands are executed in the order of addresses n, n+1, . . . , n+6, n+7, and m. Mis-hits take place at addresses n to n+10 and m to m+3 of the cache memory. On the other hand, hits take place at addresses m+4 to m+10 of the cache memory. The external memory 130 is accessed in the page mode of the DRAM. Until first data is received, it takes two clock periods CK. Thus, up to two line addresses ahead can be verified.

In FIG. 15, at time t1, when the cache requester 1 supplies n−1 of a cache address CA to the cache memory apparatus 500, it n−1 of cache address CA is stored in the register 114. The accordance determining circuit 113 determines whether or not the content stored in the register 114 accords with an address stored in the cache tag memory 111. In this case, since they accord with each other, data corresponding to the address n−1 is read from the cache data memory 112 through the data output terminal Do. The output data of the output terminal Do is cache data CD and supplied to the cache requester 1.

At time t2, when the cache requester 1 supplies n as a cache address CA, since the determined result of the accordance determining circuit 113 is a mis-hit, and the cache memory apparatus 500 enters update mode. The address n, where a mis-hit took place, is written to the register 116 through the selector 581. The selector 581 normally selects the register 114.

At time t3, the cache memory is empty state (wait state). Due to the specification of the external memory 130, it takes two clock periods CK until data is stored in the cache memory. At time t4, the same operation is performed. While data is not stored in the cache memory, the mis-hit determining means 560 determines whether or not a mis-hit takes place in the next line address.

In other words, in wait state at times t3 and t4, the signal level of the signal HIT received from the control circuit is "L". Although the selector 561 normally selects the register 563, while the signal HIT is in "L" level, the selector 561 selects the register 563. Since the register 562 receives the output of the adder 563, which increments the output of the selector 561 by 1, it can be determined whether or not a mis-hit takes place at the next line address in wait state. While this operation is being performed, a tag hit signal TAG-HIT, which is output from the accordance determining circuit 113 is invalid against a required cache address CA. Thus, the tag hit signal TAG-HIT is masked by the AND gate 574 with the signal HIT-E. Thus, at times t3 and t4, mis-hits take place. Consequently, the line address where a mis-hit took place, and the succeeding two line addresses are updated at the same time.

At time t5, since data of the cache address where the mis-hit took place is received, the cache data memory 112 and the cache tag memory 111 become write state. Although the cache data memory 112 has a cache address CA, an address EA is supplied from the external register 116 to the external memory 130 in the write mode. Data is read from the output terminal D of the external memory 130. The data and the tag TAG stored in the cache tag memory 111 and the cache data memory 112 are updated. At this point, a counter portion that accords with the in-line address IA of the external register 116 is incremented by the adder 535 so as to update the next data. While the line address is being updated, the selector 536 selects the adder 535.

At time t6, since the accordance determining circuit 113 determines whether or not two data accord with each other, a hit takes place in the cache data memory 112. Thus, cache data CD corresponding to cache address n, which is read from the data output terminal Do of the cache data memory 112 is supplied to the cache requester 1. In addition, n+1 of a cache address CA that is newly required is written to the register 114. At times t7 to t10, the same operations as those at times t5 and t6 are performed.

At time t11, the last address of the line where the mis-hit took place is updated. This operation is basically the same as the operation at time t5. In addition, the necessity determining means 570 determines whether to update the next line.

In other words, at time t3, it is clear that a mis-hit takes place in the next line address. The decoded result representing whether a branch command is present in the line address is stored in the flag 573. The flag 573 is reset when the signal HIT-E, which is output from the control circuit 110, is in "L" level. The signal HIT-E is output when the cache data memory 112 is in write state (at times t5, t7, t9, and t11). Thus, at time t11, the value of the flag 573 and the decoded result are ORed by the OR gate 572 so as to determine whether or not a branch command is present in a line address where a mis-hit takes place. In this case, since there is no branch command at the line address where such a mis-hit took place, the output (incremented value) of the adder 582 is loaded to the external register 116 so as to update the next line address.

At time t12, the same operation as that at time t6 is performed. In addition, at times t13 to t19, the same operations as those at times t5 to 511 are performed. At time t4, it is known that a mis-hit takes place in the next line address. However, at time t17, since the necessity determining means 570 has determined that a branch command is present, the content of the flag 573 is "1". Thus, since the next update operation is not performed, the access to the external memory 130 is stopped.

The operation performed at time t20 is the same as the operation performed at time t12. At time t20, a cache address CA stored in the register 114 is an address m that took place by a branch command at an address n+6. The operations at time t21 or later are the same as the operations at time t2 or later for a cache update cycle that takes place by a request of the cache requester 1.

An advantage of the fifth embodiment is as follows.

In the fifth embodiment, while the cache memory is not busy (namely, in wait state) until data is received after a mis-hit takes place, the mis-hit determining means 560 determines whether or not a mis-hit takes place at the next line address thereof. The necessity determining means 570 determines whether or not successive addresses are required (for example, there is no branch command). When the successive addresses are required, the updating means 580 updates the next line address. Thus, the hit rate can be improved.

Sixth Embodiment

Figure 16:
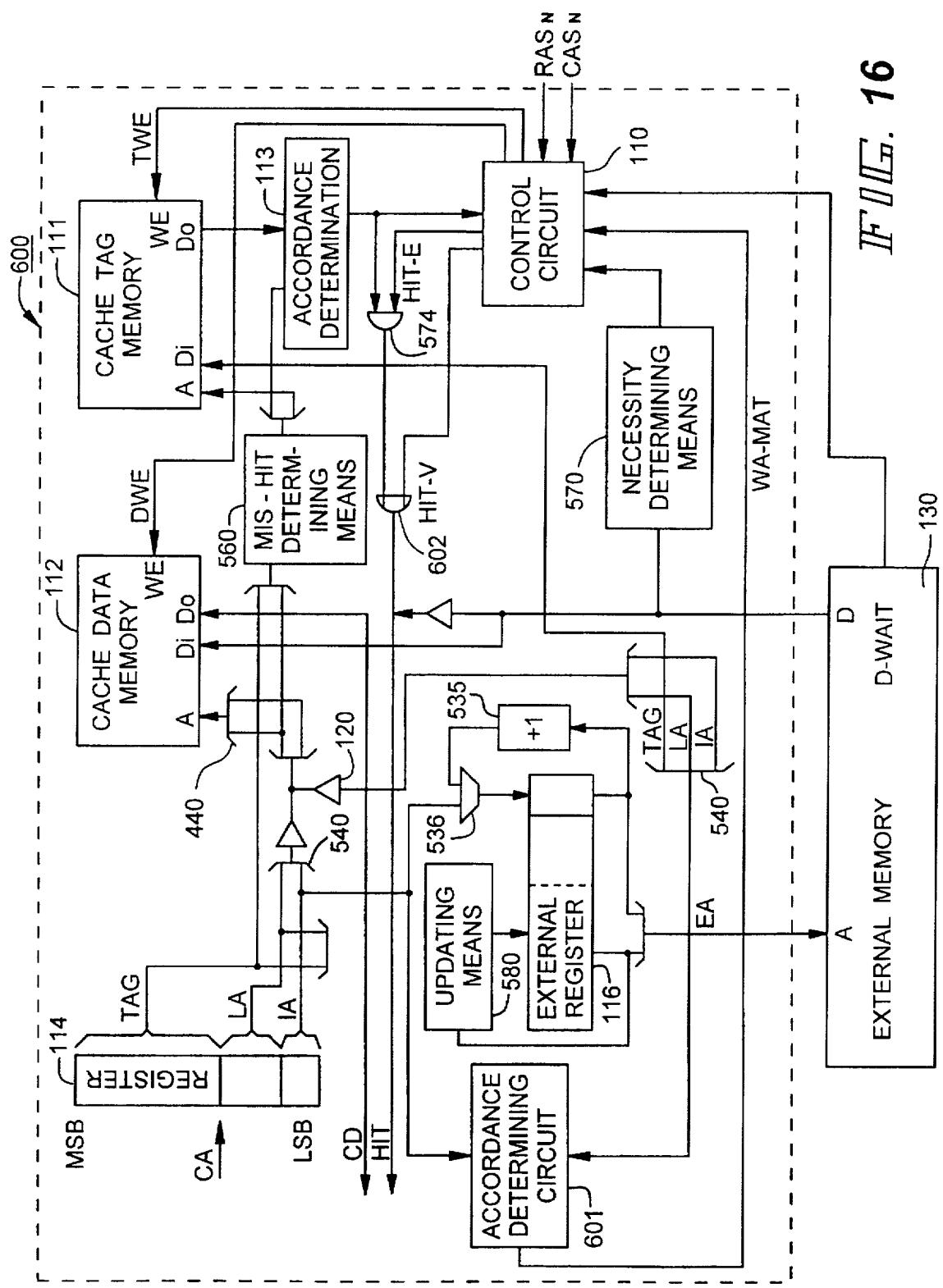
FIG. 16 is a schematic diagram showing a circuit of a cache memory apparatus according to a sixth embodiment of the present invention.

FIG. 16 is a schematic diagram showing a circuit of a cache memory apparatus according to a sixth embodiment of the present invention. In FIG. 16, reference numeral 600 is a cache memory apparatus according to the sixth embodiment. The difference between the cache memory apparatus 600 according to the sixth embodiment and the cache memory apparatus 500 according to the fifth embodiment is that write operations for a cache data memory 112 and a cache memory 111 are independently performed in the sixth embodiment. Thus, in the sixth embodiment, while data is being written to the cache data memory 112 due to an occurrence of a mis-hit, with the cache tag memory 111, it can be determined whether a hit or a mis-hit takes place at the subsequent line address.

In FIG. 16, reference numeral 110 is a control circuit. The control circuit 110 outputs write enable signals TWE and DWE that enable write operations for the cache tag memory 111 and the cache data memory 112 corresponding to detected results of accordance determining circuits 501 and 601, respectively. In addition, the cache memory apparatus 600 includes an OR gate 602. The accordance determining circuit 601 determines whether or not a tag TAG of a cache address CA accords with a line address and whether or not a tag TAG of a cache address stored in an external register 116 accords with a line address LA. When they accord with each other, the accordance determining circuit 601 outputs a write matching signal WA-MAT to the control circuit 110. In other words, the accordance determining circuit 601 determines whether or not the external memory has output a required address. The control circuit 110 outputs the write enable signal DWE to the cache data memory 112 corresponding to the write matching signal WA-MAT. In addition, the control circuit 110 outputs the write enable signal TWE to the cache tag memory 111 for each line data. The OR gate 602 ORes a HIT-V signal representing that data of an external memory 130 is valid and the output from the control circuit 110 and outputs the resultant data that is a hit signal to the cache requester.

Figure 17:
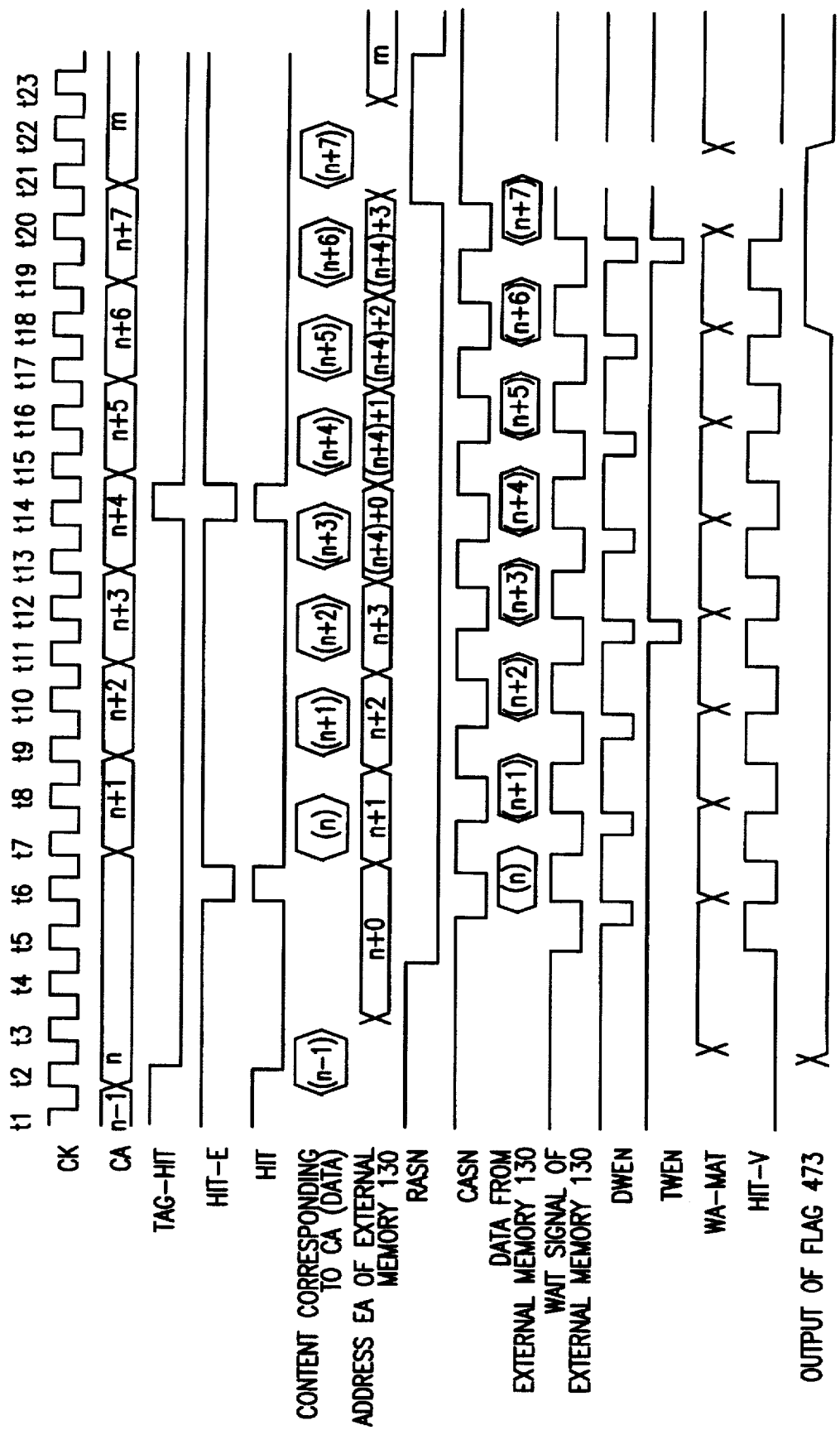
FIG. 17 is a timing chart showing the operation of the cache memory apparatus of FIG. 16.

Next, with reference to FIG. 17, the operation of the cache memory apparatus 600 as shown in FIG. 16 will be described. FIG. 17 is a timing chart showing the operation of the cache memory apparatus 600. In FIG. 17, one line has four addresses. The external memory 130 is initially accessed with two clock periods. Successive addresses are valid with one clock period. Mis-hits take place at n to n +7 of cache addresses CA. A branch command is present at a cache address n+6.

At time t1, since a mis-hit takes place at a required address n−1, the address n−1 is directly supplied to the cache tag memory 111. At time t2, a mis-hit takes place at an address n. Since the external memory 130 is accessed after time t4, the address n is supplied to an external register 116 through the updating means 580. Thus, cache data at the address n is updated. At times t7 to 12, hit statuses at the addresses n+1, n+2, and n+3, which are in the same line as the address n, are determined. Since mis-hits take place at all the addresses n+1, n+2, and n+3, data at the addresses n+1, n+2, and n+3 are supplied from the external memory. The addresses n+1, n+2, and n+3 are written to the cache data memory 112 corresponding to the write enable signal DWE. At this time, the accordance determining circuit 601 determines whether or not data at the required address has been read from the external memory 130. For example, at time t7, since the required cache address CA is n+1, when an adding circuit 535 increments low order one bit (IA) of the address n stored in the external register 116 by 1, the accordance determining circuit 601 determines that the two data accord with each other and outputs the WA-MAT signal to the control circuit 110. In addition, since the external memory 130 is in read state, a D-WAIT signal is supplied to the control circuit 110. The control circuit 110 issues the HIT-V signal to the cache requester so as to inform it that the required address is correctly read with the WA-MAT signal and the D-WAIT signal. At time t6, the cache data memory 112 is updated. At this point, the updating means 580 generate a line address just following the address n. In other words, the updating means 580 generates an address n+4. Thus, the hit status of the cache tag memory 111 against the address n+4 is determined. In this embodiment, a mis-hit takes place at the address n+4. The result of this mis-hit is stored in a register (not shown). At time 12, the result can be supplied to the control circuit 110. Thus, at time t12, the line of the address n has been updated. The control circuit outputs the write enable signal TWE along with the fourth write enable signal DWE. Since a necessity determining means 570 does not determine a branch command at the addresses n to n+3, the update operation is continued. Thus, the line of n+4 is updated. At time t17, the necessity determining means 470 determines that n +6 is a branch command. The result of the determination is supplied to the control circuit 110. At time t21, the line of n+4 has been updated. At this point, the same operation as described above is performed for an address m to be branched.

In the above-described six embodiments, the cache memory apparatus according to the present invention was described. However, it should be noted that the circuits and timings of the operations in the above-described embodiments may be modified in various manners unless the operations described above can be accomplished.

As described above, according to the first embodiment of the present invention, since a means for supplying data that is being written to a cache requester during updating cache data due to an occurrence of a mis-hit is provided, the hit rate can be improved, and the mis-hit penalty time can be reduced.

According to the second embodiment of the present invention, since a means for suspending the update of cache data corresponding to a wait request by a cache requester is provided in the apparatus according to the first embodiment, the operability of the entire system having a cache memory apparatus can be improved.

According to the third embodiment of the present invention, since a means for suspending the output of cache data to a cache requester corresponding to a wait request issued thereby and a means for a buffer means for storing cache data that is updated in wait state of the cache data are provided in the apparatus according to the first embodiment, cache data can be successively updated regardless of an occurrence of a wait request. In addition, cache data that has been updated in wait state can be accessed, thereby better improving the operability than the apparatus of the second embodiment.

According to the fourth embodiment of the present invention, a means for determining the necessity of storing cache data to be stored in a buffer means is provided in the apparatus according to the third embodiment so as to store necessary cache data in the buffer means. Thus, the same effect as the third embodiment can be accomplished by smaller hardware amount than the third embodiment.

According to the fifth embodiment of the present invention, a means for determining whether or not a mis-hit takes place in the next line address data of line address data of cache data where a mis-hit took place during updating cache data, a means for determining whether or not the content of cache data that is being updated is required, and a means for updating the next line address data in the condition that the content of the data being updated by the determining means is required and a mis-hit takes place in the next line address data are provided, the hit status of the next line data can be determined until cache data is updated. In addition, unless a branch command or the like is not present at an address being updated, the next line address data can be successively updated. Thus, the operating efficiency and hit ratio can be improved and the mis-hit penalty time can be reduced.

According to the sixth embodiment of the present invention, since an accordance determining circuit for controlling a cache data memory and a cache tag memory with different write enable signals and for determining whether or not required cache memory data accords with data stored in an external memory is provided in the cache memory apparatus according to the fifth embodiment, even if a control circuit controls the cache data memory and the cache tag memory with different write enable signals, a HIT signal that represents data is being correctly written is output to the cache requester. Thus, while the cache data memory is being updated, the hit status of the next cache address of a cache address being updated can be determined with the cache tag memory. Consequently, the same effect as the fifth embodiment can be accomplished.

What is claimed is:

1. A cache memory apparatus for reading at high speed data corresponding to an input address information, the cache memory apparatus coupled to a main memory for storing a plurality of data each corresponding to a plurality of address information, each address information including a first address information and a second address information and the cache memory apparatus having a first data group which is part of the plurality of data, the cache memory apparatus comprising:

a first register for receiving said input address information and for storing and outputting said input address information;

a first memory for storing a portion of said first address information corresponding to said first data group;

a second memory for storing a plurality of said second address information corresponding to said first address information in said first memory and a portion of said first data group corresponding to said first address information in said first memory;

a first comparing circuit for comparing said first address information of said input address information with said first address information stored in said first memory, the first comparing circuit determining whether the first address information of said input address information is in accord or not with the first address information stored in said first memory;

a controlling circuit for controlling said first and second memories to write said first address information of said input address, said plurality of said second address information corresponding to the first address information of the input address information and said portion of said first data group corresponding to said first address information of said input address information in said first and second memories, when said first comparing circuit has determined that there is non-accordance;

a second register for storing said input address information and for updating said second address information of stored input address information, when said first comparing circuit has determined that there is non-accordance said second register outputting an updated address information to said main memory for writing said updated address information which includes stored first address information and updated second address information;

a second comparing circuit for comparing an output of said first register with said updated address information, said second comparing circuit activating when said first comparing circuit has determined that there is non-accordance; and a gate circuit for receiving and outputting data read from said main memory in accordance with a comparing result of said second comparing circuit.

2. A cache memory apparatus as set forth in claim 1, wherein said gate circuit comprises a third register.

3. The cache memory apparatus as set forth in claim 1, wherein said gate circuit further outputs data read from said second memory in accordance with said comparing result of said first comprising circuit.

4. The cache memory apparatus as set forth in claim 1, wherein said second register is operable to update said second address information when said first comparing circuit has determined there is non-accordance.

5. The cache memory apparatus as set forth in claim 1, wherein said updated address information is for rewriting to said first and second memory.

6. The cache memory apparatus as set forth in claim 1, further comprising an inhibiting circuit for inhibiting said gate circuit from receiving said data read from said main memory.

7. The cache memory apparatus as set forth in claim 1, further comprising an inhibiting circuit for inhibiting said gate circuit from receiving said data read from said main memory and updating said second address information which stored said input address information to said second register.

8. The cache memory apparatus as set forth in claim 5, further comprising an inhibiting circuit for inhibiting said gate circuit from receiving said data which read from said main memory updating said second address information which stored said input address information to said second register, and rewriting to said first and second memory.

9. The cache memory apparatus as set forth in claim 8, further comprising:

a sub register for storing said updating address information which stored said input address information to said second register and data read from said main memory in accordance with the updated address in formation;

a sub comparing circuit for comparing said address information stored in said sub register with input address information further received said first register;

a sub gate circuit for transferring said data stored in said sub register to said gate circuit in accordance with a comparing result of said sub comparing circuit and for cancelling to activate said inhibiting circuit.

10. The cache memory apparatus as set forth in claim 9, further comprising a monitor for controlling said sub register for storing said updating address information and said data in accordance with the updated address information, said monitor circuit determining according to said comparing result of said first, second and sub comparing circuits.

11. A cache memory apparatus for reading at high speed data corresponding to an input address information, the cache memory apparatus coupled to a main memory for storing a plurality of data each corresponding to a plurality of address information, each address information including a first address information and a second address information and the cache memory apparatus having a first data group which is part of the plurality of data, the cache memory apparatus comprising:

a first register for receiving said input address information and for storing and outputting said input address information;

a first memory for storing a portion of said first address information corresponding to said first data group;

a second memory for storing a portion of said second address information corresponding to said first data group and said first data group;

a first comparing circuit for comparing said first address information of said input address information with said first address information stored in said first memory, the first comparing circuit determining whether the first address information of said input address information is in accord or not with the first address information stored in said first memory;

a second register for storing said input address information and for updating said second address information of stored input address information in accordance with a comparing result of said first comparing circuit, said second register outputting an updated address information which includes stored first address information and updated second address information;

a second comparing circuit for comparing an output of said first register with said updated address information;

a gate circuit for receiving and outputting data read from said main memory in accordance with a comparing result of said second comparing circuit;

an inhibiting circuit for inhibiting said gate circuit from receiving said data which read from said main memory, updating said second address information which stored said input address information to said second register, and rewriting to said first and second memory;

a sub register for storing said updating address information which stored said input address information to said second register and data read from said main memory in accordance with the updated address information;

a sub comparing circuit for comparing said address information stored in said sub register with input address information further received from said first register; and a sub gate circuit for transferring said data stored in said sub register to said gate circuit in accordance with a comparing result of said sub comparing circuit and for cancelling said inhibiting circuit, wherein said updated address information is for rewriting to said first and second memory.

12. The cache memory apparatus as set forth in claim 11, further comprising a monitor for controlling said sub register for storing said updating address information and said data in accordance with the updated address information, said monitor determining according to said comparing result of said first, second and sub comparing circuits.

* * * * *